US011506255B2

(12) United States Patent
Bica et al.

(10) Patent No.: US 11,506,255 B2
(45) Date of Patent: Nov. 22, 2022

(54) MECHANICAL RENEWABLE GREEN ENERGY PRODUCTION

(71) Applicant: PHOS GLOBAL ENERGY SOLUTIONS, INC., Fort Lauderdale, FL (US)

(72) Inventors: Victor Bica, Saint James, NY (US); Eugene Earle Rudolph, Port Jefferson Station, NY (US)

(73) Assignee: PHOS GLOBAL ENERGY SOLUTIONS, INC., Fort Lauderdale, FL (US)

( * ) Notice: Subject to any disclaimer, the term of this patent is extended or adjusted under 35 U.S.C. 154(b) by 3 days.

(21) Appl. No.: 17/158,831

(22) Filed: Jan. 26, 2021

(65) Prior Publication Data

US 2021/0148435 A1 May 20, 2021

Related U.S. Application Data

(63) Continuation of application No. 16/925,071, filed on Jul. 9, 2020, now Pat. No. 10,900,540.
(Continued)

(51) Int. Cl.
*H02K 7/09* (2006.01)
*F16F 15/315* (2006.01)
(Continued)

(52) U.S. Cl.
CPC ............ *F16F 15/315* (2013.01); *H02K 7/02* (2013.01); *H02K 7/1815* (2013.01); *H02K 7/20* (2013.01);
(Continued)

(58) Field of Classification Search
CPC ....................................................... H02K 7/09
See application file for complete search history.

(56) References Cited

U.S. PATENT DOCUMENTS 2,460,015 A * 1/1949 Jones ................... H02K 49/106
310/103
3,523,204 A * 8/1970 Rand ..................... H02K 49/06
310/94
(Continued)

FOREIGN PATENT DOCUMENTS

| CN | 1269628 A | 10/2000 |
| JP | 2008035589 A | 2/2008 |
| WO | 2010123343 A1 | 10/2010 |

OTHER PUBLICATIONS

"Deep Blue Hybrid", https://www.torqeedo.com/us/en-us/products/hybrid-drives, accessed Oct. 21, 2020.
(Continued)

*Primary Examiner* — Dang D Le
(74) *Attorney, Agent, or Firm* — Weber Rosselli & Cannon LLP

(57) ABSTRACT

A flywheel assembly for a renewable energy generation system includes a flywheel housing defining a cavity therein, a flywheel rotatably disposed within the cavity of the flywheel housing, where the flywheel is simultaneously formed from the same component as the flywheel housing, a magnetic levitation disk defining opposed upper and lower surfaces, the upper surface supporting the flywheel and the lower surface including a first plurality of magnets disposed thereon, and a base plate having a second plurality of magnets disposed on a surface thereof that is facing the first plurality of magnets, the second plurality of magnets having a polarity that is opposite of a polarity of the first plurality of magnets such that the magnetic force of the first and second plurality of magnets urges the magnetic levitation disk away from the base plate.

18 Claims, 20 Drawing Sheets

Related U.S. Application Data

(60) Provisional application No. 63/027,204, filed on May 19, 2020, provisional application No. 62/929,562, filed on Nov. 1, 2019.

(51) Int. Cl.
| | |
|---|---|
| *H02N 15/00* | (2006.01) |
| *H02K 7/02* | (2006.01) |
| *H02K 7/18* | (2006.01) |
| *H02K 7/20* | (2006.01) |
| *H02K 49/10* | (2006.01) |
| *F02M 21/02* | (2006.01) |
| *C25B 1/04* | (2021.01) |
| *F02B 43/10* | (2006.01) |

(52) U.S. Cl.
CPC .......... *H02K 49/108* (2013.01); *H02N 15/00* (2013.01); *C25B 1/04* (2013.01); *F02B 43/10* (2013.01); *F02B 2043/106* (2013.01); *F02M 21/0209* (2013.01); *F02M 21/0239* (2013.01)

(56) References Cited

U.S. PATENT DOCUMENTS

| | | | |
|---|---|---|---|
| 3,526,795 A | 9/1970 | Pecs | |
| 4,211,452 A | 7/1980 | Poubeau | |
| 4,677,365 A | 6/1987 | Yang | |
| 5,563,802 A | 10/1996 | Plahn et al. | |
| 5,690,519 A * | 11/1997 | Chen .................. | B63H 23/22 |
| | | | 417/420 |
| 6,114,775 A | 9/2000 | Chung et al. | |
| 6,188,139 B1 | 2/2001 | Thaxton et al. | |
| 6,236,127 B1 | 5/2001 | Bornemann | |
| 6,611,068 B2 | 8/2003 | Cratty | |
| 6,770,995 B1 | 8/2004 | Foshage | |
| 6,803,679 B1 | 10/2004 | Luo et al. | |
| 6,931,856 B2 | 8/2005 | Belokon et al. | |
| 8,039,983 B2 | 10/2011 | Cote et al. | |
| 8,049,358 B2 | 11/2011 | Crane et al. | |
| 8,907,520 B2 | 12/2014 | Chapel et al. | |
| 9,742,331 B2 | 8/2017 | Liang et al. | |
| 9,751,625 B2 | 9/2017 | Phan et al. | |
| 10,208,755 B2 * | 2/2019 | Semple .................. | F04D 13/027 |
| 10,389,121 B1 | 8/2019 | Sherry | |
| 10,541,597 B2 * | 1/2020 | Whitfield ............. | H02K 49/102 |
| 2002/0175660 A1 | 11/2002 | King et al. | |
| 2004/0051507 A1 | 3/2004 | Gabrys et al. | |
| 2006/0091748 A1 * | 5/2006 | Yoda .................... | H02K 49/102 |
| | | | 310/83 |
| 2008/0047391 A1 | 2/2008 | Bissell | |
| 2011/0316377 A1 | 12/2011 | Warmenhoven | |
| 2012/0083173 A1 | 4/2012 | McMillan | |
| 2012/0280518 A1 | 11/2012 | Woods et al. | |
| 2013/0234653 A1 | 9/2013 | Botts | |
| 2014/0184153 A1 | 7/2014 | Saint-Leger et al. | |
| 2015/0097432 A1 | 4/2015 | Gurin et al. | |
| 2015/0188400 A1 | 7/2015 | Kemp et al. | |
| 2016/0241029 A1 | 8/2016 | Hodrinsky et al. | |
| 2016/0352131 A1 | 12/2016 | Nelson et al. | |
| 2017/0063150 A1 | 3/2017 | Sakamoto et al. | |
| 2017/0085141 A1 | 3/2017 | Wang et al. | |
| 2017/0294691 A1 | 10/2017 | Yamamoto et al. | |
| 2018/0009329 A1 | 1/2018 | Tellez | |
| 2018/0357577 A1 | 12/2018 | ElBsat et al. | |
| 2019/0229542 A1 | 7/2019 | Dunn et al. | |
| 2020/0063706 A1 | 2/2020 | Park | |
| 2021/0184539 A1 | 6/2021 | Ashley | |

OTHER PUBLICATIONS

Non-Final Office Action issued in U.S. Appl. No. 16/925,071 dated Sep. 29, 2020, 15 pages.
PCT Search Report and Written Opinion issued in PCT/US2020/046453 dated Oct. 21, 2020, 12 pages.
Non-Final Office Action issued in U.S. Appl. No. 16/944,782 dated Sep. 28, 2021.
Notice of Allowance and Fees Due issued in U.S. Appl. No. 16/944,782 dated Apr. 13, 2022.

* cited by examiner

MECHANICAL RENEWABLE GREEN ENERGY PRODUCTION

CROSS-REFERENCE TO RELATED APPLICATION

The present application is a continuation of U.S. patent application Ser. No. 16/925,071 filed Jul. 9, 2020, now U.S. Pat. No. 10,900,540, which claims the benefit of and priority to U.S. Provisional Patent Application Ser. No. 63/027,204, filed on May 19, 2020, and U.S. Provisional Patent Application Ser. No. 62/929,562, filed on Nov. 1, 2019, the entire content of each of which is hereby incorporated by reference herein.

TECHNICAL FIELD

The present disclosure relates generally renewable energy devices, and in particular, mechanical renewable energy generation and storage devices.

BACKGROUND

Renewable energy generation, or green energy generation, has become an increasingly important source of electrical energy generation many countries around the world. As the demand for electrical energy has increased, the availability of fossil fuels has been strained, and the impact of using fossil fuels on the environment has been highlights. In an effort to overcome these obstacles, advancements in green energy generation has continued to accelerate, resulting in innovations such as hydrodynamic generators, wind turbines, geothermal energy, biomass energy, amongst others. However, mechanical energy generation, despite its simplicity, has historically remained rather inefficient. In particular, as a load is placed upon the system, the mechanical device driving electrical generators loses momentum, resulting in a drop in electrical energy generation. To avoid this decrease in electrical energy generation, it is necessary to input additional energy to maintain consistency and therefore, provide consistent electrical energy generation. As can be appreciated, the constant increase or decrease in energy required to maintain constant electrical energy generation using the mechanical device is inefficient and wasteful.

SUMMARY

The present disclosure relates to a flywheel assembly for a renewable energy generation system including a flywheel housing defining a cavity therein, a flywheel rotatably disposed within the cavity of the flywheel housing, wherein the flywheel is simultaneously formed from the same component as the flywheel housing, a magnetic levitation disk defining opposed upper and lower surfaces, the upper surface supporting the flywheel and the lower surface including a first plurality of magnets disposed thereon, and a base plate having a second plurality of magnets disposed on a surface thereof that is facing the first plurality of magnets, the second plurality of magnets having a polarity that is opposite of a polarity of the first plurality of magnets such that the magnetic force of the first and second plurality of magnets urges the magnetic levitation disk away from the base plate.

In aspects, the flywheel assembly may include a magnetic coupling disposed on an upper surface of the flywheel.

In other aspects, the magnetic coupling may include a first plurality of torque magnets disposed thereon, wherein the first plurality of torque magnets defines an alternating pattern of magnets having a north polarity and a south polarity.

In certain aspects, the flywheel assembly may include a drive motor coupling operably coupled to a motor such that rotation of the drive motor effectuates a corresponding rotation of the motor coupling.

In other aspects, the motor coupling may include a second plurality of torque magnets disposed thereon, wherein the second plurality of torque magnets defines an alternating pattern of magnets having a north polarity and a south polarity such that rotation of the motor coupling effectuates a corresponding rotation of the magnetic coupling via the attraction and repulsion of the north and south poles of each of the first and second plurality of torque magnets.

In aspects, the flywheel assembly may include a flywheel shaft, wherein the flywheel is fixedly secured to the flywheel shaft such that the flywheel shaft and the flywheel rotate in unison, the flywheel shaft constraining the flywheel to one degree of freedom.

In other aspects, the flywheel assembly may include a vacuum pump that is configured to draw a vacuum within the cavity of the flywheel housing.

In certain aspects, the flywheel assembly may include a second flywheel housing and a second flywheel rotatably disposed within the cavity of the second flywheel housing. The second flywheel is simultaneously formed from the same component as the second flywheel housing.

In other aspects, the first and second flywheel may define a plurality of keys therein and include a corresponding plurality of keyways disposed thereon. The plurality of keys of the first and second flywheels configured to be received within the plurality of keyways of the first and second flywheels such that rotation of the first flywheel effectuates a corresponding rotation of the second flywheel.

In accordance with another aspect of the present disclosure, a renewable energy generation system includes a drive motor having an output shaft rotatably coupled thereto and a flywheel assembly. The flywheel assembly includes a flywheel housing defining a cavity therein, a flywheel rotatably disposed within the cavity of the flywheel housing, wherein the flywheel is simultaneously formed from the same component as the flywheel housing, a magnetic levitation disk defining opposed upper and lower surfaces, the upper surface supporting the flywheel and the lower surface including a first plurality of magnets disposed thereon, and a base plate having a second plurality of magnets disposed on a surface thereof that is facing the first plurality of magnets, the second plurality of magnets having a polarity that is opposite of a polarity of the first plurality of magnets such that the magnetic force of the first and second plurality of magnets urges the magnetic levitation disk away from the base plate.

In aspects, the flywheel assembly may include a magnetic coupling disposed on an upper surface of the flywheel. The magnetic coupling includes a first plurality of torque magnets disposed thereon that define an alternating pattern of magnets having a north polarity and a south polarity.

In certain aspects, the flywheel assembly may include a motor coupling that is operably coupled to the output shaft of the drive motor such that rotation of the output shaft of the drive motor effectuates a corresponding rotation of the motor coupling.

In other aspects, the motor coupling may include a second plurality of torque magnets disposed thereon that define an alternating pattern of magnets having a north polarity and a south polarity such that rotation of the motor coupling effectuates a corresponding rotation of magnetic coupling via the attraction and repulsion of the north and south poles of each of the first and second polarity of torque magnets.

In aspects, the renewable energy generation system may include a second flywheel assembly that is operably coupled to the first flywheel assembly such that rotation of the first flywheel assembly effectuates a corresponding rotation of the second flywheel assembly.

In other aspects, the renewable energy generation system may include a vacuum pump that is configured to draw a vacuum within the cavity of the flywheel housing.

In accordance with yet another aspect of the present disclosure, a renewable energy generation system includes a flywheel assembly pod including first and second flywheel assemblies disposed adjacent to and spaced apart from one another defining a channel therebetween and a central motor coupling disposed at least partially within the channel. Each of the first and second flywheel assembly includes a flywheel housing defining a cavity therein, a flywheel rotatably disposed within the cavity of the flywheel housing, wherein the flywheel is simultaneously formed from the same component as the flywheel housing, and a magnetic coupling disposed on an upper surface of the flywheel, the magnetic coupling including a first plurality of torque magnets disposed thereon, wherein the first plurality of torque magnets define an alternating pattern of magnets having a north plurality and a south plurality. The central motor coupling includes a second plurality of torque magnets disposed thereon that define an alternating pattern of magnets having a north polarity and a south polarity such that rotation of the central motor coupling effectuates a corresponding rotation of the magnetic coupling of each of the first and second flywheel assemblies via the attraction and repulsion of the north and south poles of each of the first and second plurality of torque magnets.

In aspects, the renewable energy generation system may include a generator having a rotatable output shaft operably coupled to the central drive coupling of the flywheel assembly pod such that rotation of the output shaft of the generator effectuates a corresponding rotation of the magnetic coupling of each of the first and second flywheel assemblies.

In certain aspects, each of the first and second flywheel assemblies may include a vacuum pump that is configured to draw a vacuum within the cavity of the flywheel housing of each respective flywheel assembly of the first and second flywheel assemblies.

In other aspects, each flywheel assembly of the first and second flywheel assemblies may include a second flywheel housing and a second flywheel rotatably disposed within the cavity of the second flywheel housing that is simultaneously formed from the same component as the second flywheel housing.

In aspects, the first and second flywheel may define a plurality of keys therein and include a corresponding plurality of keyways disposed thereon. The plurality of keys of the first and second flywheels is configured to be received within the plurality of keyways of the first and second flywheels such that rotation of the first flywheel effectuates a corresponding rotation of the second flywheel.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiments given below, serve to explain the principles of the disclosure, wherein.

DETAILED DESCRIPTION

Figure 1:
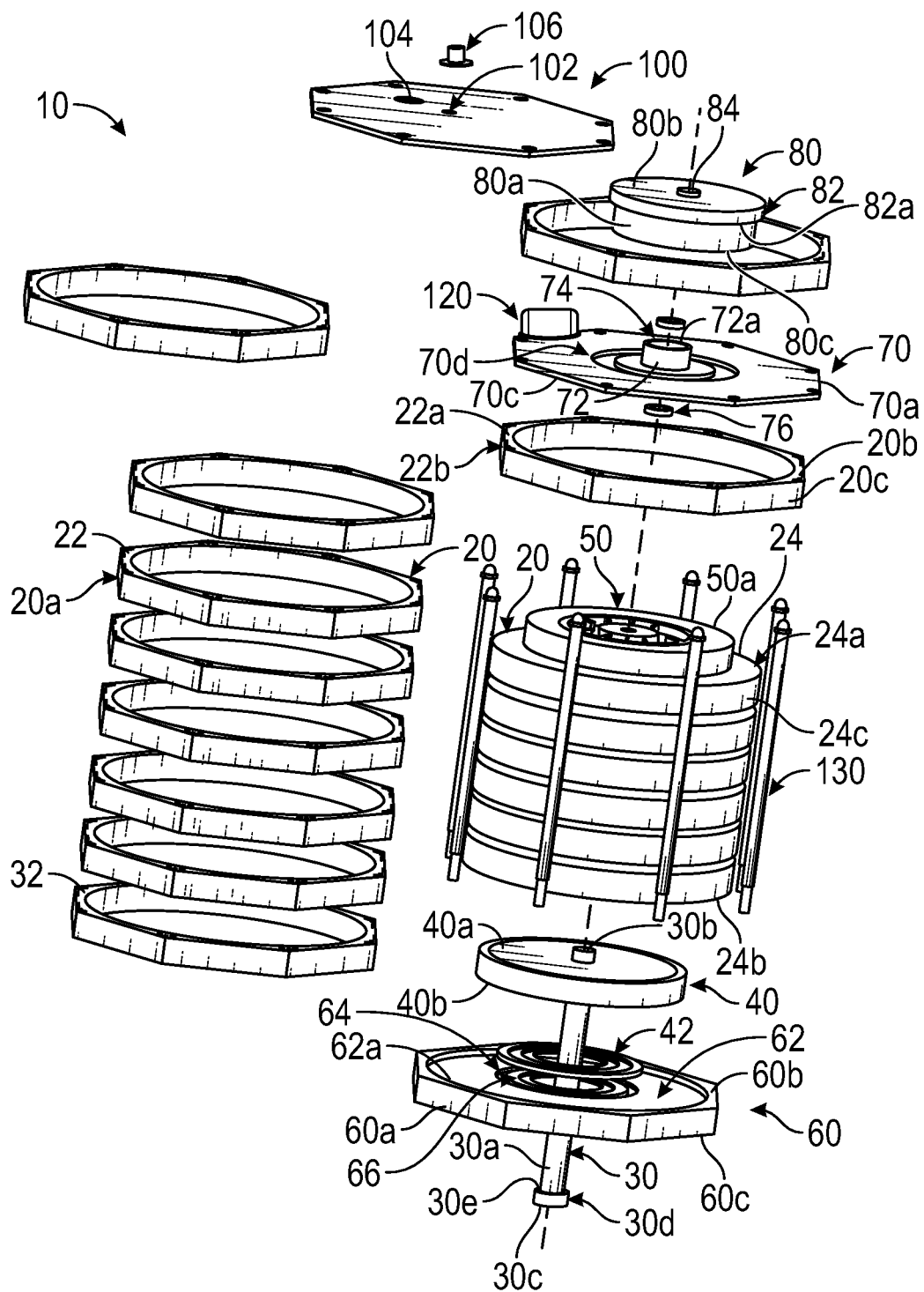
FIG. 1 is an exploded, perspective view of a flywheel assembly provided in accordance with the present disclosure.

The present disclosure is directed to renewable energy generation systems including a flywheel assembly. As described herein, the flywheel assembly includes a plurality of flywheel housings and a corresponding plurality of flywheels disposed within each respective housing that is simultaneously formed from the same component or material as the flywheel housing. Each flywheel is fixedly coupled to a flywheel shaft such that the flywheels and the flywheel shaft rotate in unison. In embodiments, the flywheel assembly may not include a flywheel shaft, and rather, each flywheel is selectively coupled to one another using a centering ring that is received within a corresponding annular grooved formed in upper and lower surfaces of each flywheel. In this embodiment, each flywheel is fixedly coupled using a plurality of tie bars arranged in a longitudinal manner that longitudinally fix each flywheel to one another.

The flywheel assembly includes a magnetic levitation disk having a plurality of magnets disposed thereon. In embodiments, the magnetic levitation disk may be entirely formed from a magnet and may include permanent or electromagnets. The magnetic levitation disk is fixedly coupled to the flywheel shaft and abuts a lower portion of a lower most flywheel such that the magnetic levitation disk rotates in unison with the flywheels and the flywheel shaft.

A magnetic coupling is fixedly coupled to the flywheel shaft and abuts an upper portion of an upper most flywheel. The magnetic coupling includes a plurality of torque magnets disposed on an upper surface thereof and forms a magnetic gear. In this manner, the plurality of torque magnets is arranged in an alternating manner such that a pole of each respective torque magnet of the plurality of torque magnets alternates in a north, south, north, south, etc. fashion.

A base plate includes an aperture defined at a center portion thereof that is configured to rotatably receive a lower portion of the flywheel shaft thereon. In embodiments where the flywheel assembly does not include a flywheel shaft, the aperture of the base plate is configured to rotatably receive a portion of the magnetic levitation disk therein. An upper portion of the base plate includes a plurality of magnets disposed therein having a polarity that is opposite to the magnets of the magnetic levitation disk such that the plurality of magnets of the base plate urge the plurality of magnets of the magnetic levitation disk, and therefore, the magnetic levitation disk itself, away from the base plate such that the magnetic levitation disk levitates or floats above the base plate. In this manner, the base plate constrains the flywheel shaft, magnetic levitation disk, flywheels, and magnetic coupling to one degree of freedom and forming a pseudo-levitation method of magnetic levitation to enable the flywheels to rotate in a near frictionless environment.

The flywheel assembly includes a vacuum plate that is disposed on an upper most flywheel housing to form a vacuum chamber therewithin. The vacuum plate is configured to rotatably receive a portion of the flywheel shaft, and in embodiments where the flywheel assembly does not include a flywheel shaft, a portion of the magnetic coupling, such that in cooperation with the aperture of the base plate, the flywheel shaft and flywheels are constrained to one degree of freedom. A vacuum pump is disposed on an upper portion of the vacuum plate and is in fluid communication with the chamber of the flywheel housing. In embodiments, the vacuum pump may be an ultra-high vacuum (UHV) pump, such as an ion pump, turbomolecular pump, etc. in instances where an UHV environment is required. As can be appreciated, the vacuum pump permits the flywheels to rotate within the cavity of the flywheel housing in a near zero friction environment, thereby increasing the efficiency of the flywheel assembly.

A motor coupling is rotatably supported on the vacuum plate and includes a plurality of torque magnets disposed thereon. The motor coupling is configured to operably engage a motor, generator, etc., such that rotation of a portion of the motor effectuates a corresponding rotation of the motor coupling. The plurality of torque magnets of the motor coupling is arranged an alternating manner such that a pole of each respective torque magnet of the plurality of torque magnets alternates in a north, south, north, south, etc. fashion, such that rotation of the motor coupling causes the plurality of torque magnets of the motor coupling to repel and attract the plurality of torque magnets of the magnetic coupling, thereby effectuating a corresponding rotation of the magnetic coupling.

In this manner, the magnetic coupling force between the plurality of torque magnets of the motor coupling and the plurality of torque magnets of the magnetic coupling acts as an axial-gap magnetic gear. In embodiments, the flywheel assembly may include a pair of magnetic gears rotatably supported on the vacuum plate and arranged in an axially aligned but spaced apart manner to define a gap therebetween. Each of the pair of magnetic gears includes a plurality of torque magnets arranged in an alternating fashion. A motor coupling magnetic gear may include a corresponding plurality of torque magnets arranged in an alternating fashion and disposed within the gap formed by the pair of magnetic gears, such that rotation of the motor coupling magnetic gear effectuates a corresponding rotation of the pair of magnetic gears.

It is contemplated that the flywheel assemblies may be arranged in a pod configuration (e.g., circular manner) defining a channel therebetween. In this manner, the flywheel pods include a single motor coupling disposed within the channel such that rotation of the motor coupling effectuates a corresponding rotation of the flywheels in each of the flywheel assemblies of the flywheel pod.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

Figure 2:
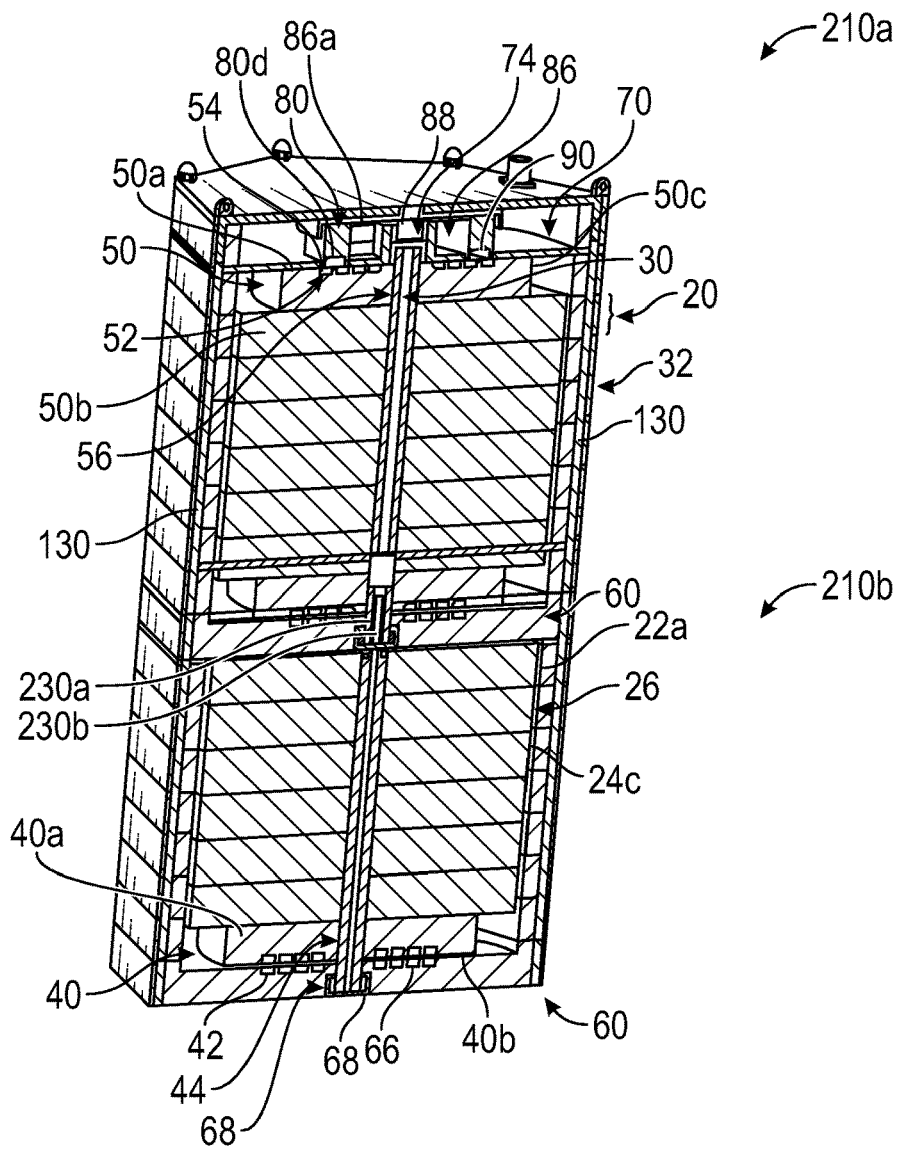
FIG. 2 is a cross-sectional view of the flywheel assembly of FIG. 1 showing a second flywheel assembly coupled thereto.
Figure 2A:
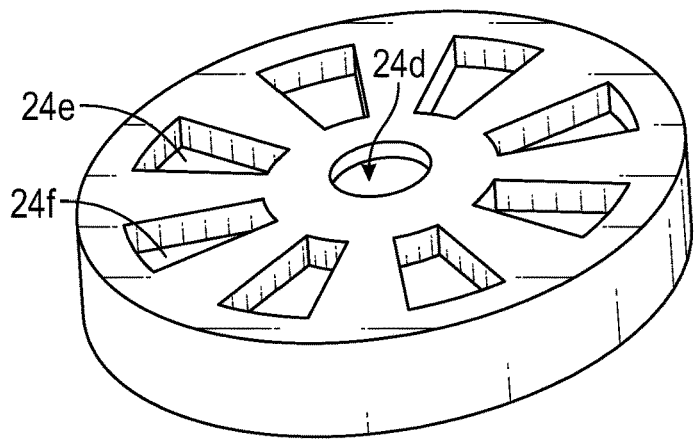
FIG. 2A is a perspective view of a flywheel of the flywheel assembly of FIG. 1 showing keys and keyways of the flywheel.
Figure 3:
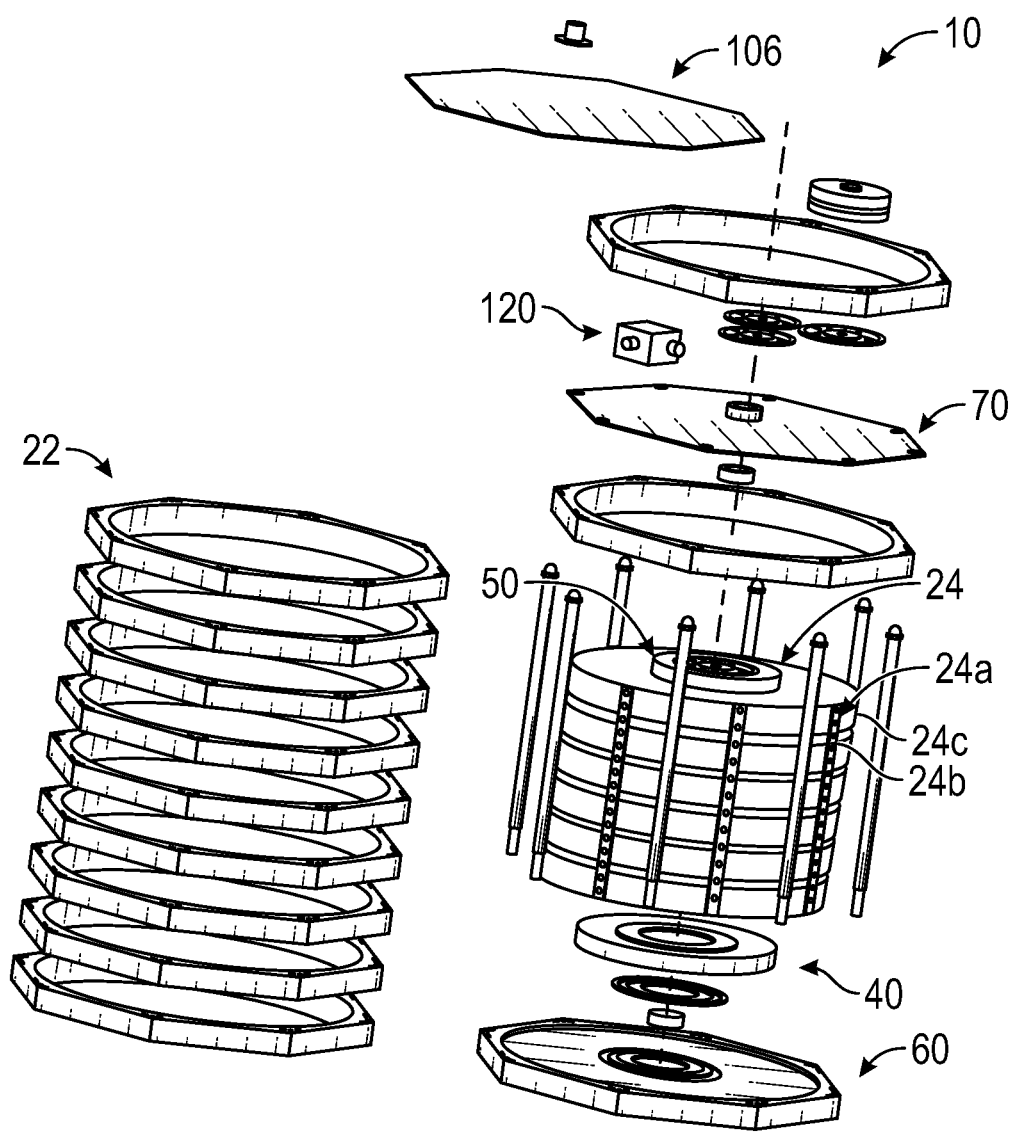
FIG. 3 is an exploded, perspective view of another embodiment of a flywheel assembly provided in accordance with the present disclosure.

Referring now to the drawings, a flywheel assembly for use with a renewable energy generation system is illustrated in FIGS. 1 and 2 and is generally identified by reference numeral 10. Although generally described herein as being utilized for renewable energy generation systems, it is contemplated that the flywheel assembly 10 may be utilized in any suitable system, such as energy generation systems, energy storage systems, etc. For a detailed description of an exemplary renewable energy generation system for use with the present disclosure, reference may be made to U.S. Patent Application Ser. No. 62/929,562, filed on Nov. 1, 2019, titled "Mechanical Renewable Green Energy Production," the entire content of which is hereby incorporated by reference herein.

The flywheel assembly 10 includes one or more flywheel segments 20, a flywheel shaft 30, a magnetic levitation disk 40, a magnetic coupling 50, a base plate 60, a vacuum plate 70, a motor and/or generator coupling 80, a top cover 100, a vacuum pump 120, and a plurality of securement bolts 130.

Each of the one or more flywheel segments 20 are substantially similar, and therefore, only one flywheel segment 20 will be described in detail herein in the interest of brevity. The flywheel segment 20 includes an outer sidewall 20a extending between opposed upper and lower surfaces 20b and 20c, respectively, and is formed from a single monolithic piece of material, such as a billet, casting, etc. Each flywheel segment 20 includes a flywheel housing 22 and a flywheel 24. The flywheel housing 22 and the flywheel 24 are separated from one another during manufacturing by cutting or milling (e.g., water jet, plasma cutting, vertical mill, lathe, horizontal mill, etc.) the flywheel 24 from the flywheel segment 20, forming separate components in the form of the flywheel housing 22 and the flywheel 24. In this manner, the flywheel segment 20 is cut through the upper and lower surfaces 20b, 20c to form a gap 26 between a resulting circumference or outer wall 24c of the flywheel 24 and a resulting inner wall 22a of the flywheel housing 22. The gap 26 formed between the outer wall 24c of the flywheel 24 and the inner wall 22a of the flywheel housing 22 includes a dimension that is configured to permit the flywheel 24 to rotate and/or be otherwise manipulated relative to the flywheel housing 22 therewithin. It is envisioned that the flywheel segments 20 may be formed from any suitable material, such as aluminum and aluminum, steel, stainless steel, tungsten, etc., and alloys and/or combinations thereof.

The flywheel 24 defines resulting opposed upper and lower surfaces 24a and 24b and the outer wall 24c extending therebetween. A borehole 24d is defined through the upper surface 24a at a center portion thereof and extends through the lower surface 24b. The borehole 24d is configured to fixedly receive a portion of a flywheel shaft 30 therein using an interference fit, friction fit, adhesives, welding, mechanical fasteners, etc. In one non-limiting embodiment, the flywheel 24 is fixedly secured to the flywheel shaft 30 by an interference fit utilizing thermal energy.

In embodiments, each of the upper and lower surfaces 24a, 24b of the flywheel 24 may include one or more keys 24e disposed thereon and one or more keyways 24f defined therein. The keys 24e and the keyways 24f are arranged on the upper and lower surfaces 24a, 24b of the flywheel 24 such that the keys 24e of one flywheel 24 may be received within corresponding keyways 24f of an adjacent flywheel 24 to lock or otherwise inhibit rotation of one flywheel 24 relative to another. In this manner, any suitable number of flywheels 24 may be stacked on one another depending upon the amount of stored energy is desired, such as one, two, three, four, five, etc. In one non-limiting embodiment, the flywheel assembly 10 includes six flywheels 24 fixedly secured to the flywheel shaft 30.

The flywheel shaft 30 includes a generally cylindrical profile having an outer surface 30a extending longitudinally between opposed first and second end surfaces 30b and 30, respectively. The flywheel shaft 30 includes an outer dimension that is configured to be fixedly retained within the borehole 24d and rotatably received within one or more bearings, as will be described in further detail hereinbelow.

As described hereinabove, in one embodiment as depicted in FIG. 2 each flywheel 24 is fixedly secured to the flywheel shaft 30 by an interference fit. In this manner, one or more flywheels 24 are heated or otherwise treated to cause the inner dimension of the borehole 24c to expand. To further aid in assembly, the flywheel shaft 30 may be cooled or otherwise treated to cause the outer dimension thereof to contract or shrink. The flywheel shaft 30 is then advanced within each borehole 24d of each respective flywheel 24 and each flywheel 24 is caused to abut each adjacent flywheel 24. In embodiments where each flywheel 24 includes a key 24e and a keyway 24f, each adjacent flywheel is caused to abut one another such that each key 24e is received within a respective keyway 24f to inhibit rotation of each flywheel 24 relative to one another. The flywheels 24 and the flywheel shaft 30 are then brough to room temperature to fix the flywheels 24 to the flywheel shaft 30 such that rotation of the flywheel shaft 30 effectuates a corresponding rotation of the flywheels 24 and vice versa.

In embodiments, the outer surface 30a of the flywheel shaft 30 defines a radial flange 30d extending radially outward therefrom adjacent the second end surface 30c. The radial flange 30d extends longitudinally from the second end surface 30c towards the first end surface 30b and terminating in an annular surface 30e. The annular surface 30e is configured to abut a portion of a ball bearing, bushing, or other similar feature to inhibit translation of the flywheel shaft 30 therethrough.

The magnetic levitation disk 40 includes a generally circular profile, although it is contemplated that the magnetic levitation disk 40 may include any suitable profile, such as hexagonal, octagonal, square, oval, etc. The magnetic levitation disk 40 may be formed from formed from any suitable material, such as aluminum and aluminum, steel, stainless steel, tungsten, etc., and alloys and/or combinations thereof. In embodiments, the magnetic levitation disk 40 may be formed entirely from a permanent magnet, such as a ceramic or ferrite magnet, an alnico magnet, an injected molded magnet, a rare earth magnet, a magnetic metallic element, etc., although it is contemplated that the magnet may be an electromagnet. In embodiments, the magnetic levitation disk 40 may include a plurality of recesses (not shown) defined therein that are configured to retain one or more magnets 42 therein (FIG. 2).

The magnetic levitation disk 40 includes opposed top and bottom surfaces 40a and 40b, respectively, and an outer surface 40c extending longitudinally therebetween. A bore 44 is defined through a center portion of the top surface 40a and extends through the bottom surface 40b. The bore 44 includes an inner dimension that is configured to receive a portion of the flywheel shaft 30 therein. It is contemplated that the bore 44 may slidably receive the flywheel shaft 30 therein or may fixedly retain the flywheel shaft 30 therein by means of interference fit, friction fit, adhesive es, welding, mechanical fasteners, etc. In this manner, the magnetic levitation disk 40 may be caused to rotate in unison with the flywheel shaft 30 or may permit the flywheel shaft 30 to rotate within the bore 44.

Continuing with FIGS. 1 and 2, the magnetic coupling 50 is includes a generally circular profile, although it is contemplated that the magnetic coupling 50 may include any suitable profile, such as hexagonal, octagonal, square, oval, etc. The magnetic coupling 50 may be formed from formed from any suitable material, such as aluminum and aluminum, steel, stainless steel, tungsten, etc., and alloys and/or combinations thereof. In embodiments, the magnetic coupling 50 may include a similar profile and similar dimensions to that of the magnetic levitation disk 40 or the flywheels 24.

The magnetic coupling 50 includes opposed upper and lower surfaces 50a and 50b, respectively, and an outer surface 50c extending longitudinally therebetween. A plurality of recesses 52 is defined through the upper surface 50a that is configured to retain a corresponding plurality of torque magnets 54 therein. The plurality of torque magnets 54 is arranged in a circumferential manner to enable the plurality of torque magnets 54 to act as a magnetic gear element in cooperation with a corresponding plurality of torque magnets 90 coupled to the motor coupling 80, as will be described in further detail hereinbelow. In this manner, the plurality of torque magnets 54 of the magnetic coupling 50 is arranged in an alternating fashion, e.g., a pole of each respective magnet of the plurality of torque magnets alternates in a north, south, north, south, etc. fashion.

The magnetic coupling 50 includes a bore 56 defined through a center portion of the upper surface 50a and extending through the lower surface 50b. The bore 56 includes an inner dimension that is configured to receive a portion of the flywheel shaft 30 therein. It is contemplated that the bore 56 may slidably receive the flywheel shaft 30 therein or may fixedly retain the flywheel shaft 30 therein by means of interference fit, friction fit, adhesive es, welding, mechanical fasteners, etc. In this manner, the magnetic coupling 50 may be caused to rotate in unison with the flywheel shaft 30 or may permit the flywheel shaft 30 to rotate within the bore 56. The combination of the flywheels 24, the flywheel shaft 30, magnetic levitation disk 40, and the magnetic coupling 50 define an aperture or spindle type configuration having a portion of the flywheel shaft 30 extending longitudinally beyond the upper surface 50a of the magnetic coupling and longitudinally beyond the bottom surface 40b of the magnetic levitation disk 40.

The base plate 60 includes a generally octagonal outer profile defining an outer surface 60a extending between opposed top and bottom surfaces 60b and 60c, respectively. In embodiments, the base plate 60 may include the same or different outer profile as the outer profile of the flywheel housing 22, such as hexagonal, oval, circular, square, etc. In one non-limiting embodiment, the outer profile of the base plate 60 is the same as the outer profile of the flywheel housing 22. The top surface 60b of the base plate defines a counterbore 62 therein that extends towards the bottom surface 60c and terminates at an inner surface 62a. A plurality of recesses 64 is defined within the inner surface 62a extending towards the bottom surface 60c. The plurality of recesses 64 is configured to receive a corresponding plurality of base magnets 66 therein such that the plurality of base magnets 66 is constrained or otherwise inhibited from being manipulated relative to the base plate 60. It is contemplated that each of the plurality of base magnets 66 may be secured within each respective recess of the plurality of recesses 64 using any suitable means, such as an interference fit, friction fit, adhesives, mechanical fasteners, etc. In embodiments, the inner surface 62a of the counterbore 62 may be planar (e.g., without the plurality of recesses) or may include a combination of planar portions and recesses 64. In this manner, it is envisioned that the plurality of base magnets 60 may be affixed to the planar inner surface 62a of the counterbore 62 using any suitable means, such as adhesives, mechanical fasteners, etc., or may include a first portion of the plurality of base magnets 66 affixed to the planar inner surface 62a and a second portion of the plurality of base magnets 66 received within corresponding recesses of the plurality of recesses 64.

As can be appreciated, the plurality of base magnets 66 facing or adjacent to the magnetic levitation disk 40 or the magnets 42 of the magnetic levitation disk 40 includes a pole opposite to the magnetic levitation disk 40 or magnets 42 such that the magnetic levitation disk 40 is urged in a direction away from the plurality of base magnets 66. In this manner, the magnetic levitation disk 40 is caused to float or levitate a distance away from the plurality of base magnets, thereby enabling the magnetic levitation disk 40 to rotate freely and without friction between two otherwise contacting surfaces.

The magnetic levitation disk 40 and the plurality of base magnets 66 cooperate to provide enough repulsive force to maintain levitation of the magnetic levitation disk 40 when one or more flywheels 24 are disposed on the magnetic levitation disk 40. In this manner, the magnetic levitation disk 40 carries or otherwise supports the one or more flywheels 24 and enables the rotation of the one or more flywheels 24 freely and without friction between two otherwise contacting surfaces.

With continued reference to FIGS. 1 and 2, an aperture 68 is defined through the inner surface 62a of the counterbore 62 of the base plate 60 and extends through the bottom surface 60c. The aperture 68 is disposed at a center portion of the counterbore 62 and includes an inner diameter that is configured to receive one or more bushings or bearings 68 therein using any suitable means, such as interference fit, friction fit, adhesives, mechanical fasteners, etc. It is contemplated that the bearings 68 may be bronze bushings (plain, oiled, grease grooved, graphite plugged, etc.), ball bearings (steel, ceramic, tungsten carbide, etc.), hydrodynamic bearings, hydrostatic bearings, magnets, etc., and combinations thereof. In one non-limiting embodiment, the bearings 68 are ball bearings.

As can be appreciated, the flywheel shaft 30 cooperates with the bearings 68 to constrain the magnetic levitation disk 40 to one degree of freedom (e.g., rotation), thereby enabling the magnetic levitation disk 40, in combination with the plurality of base magnets 66, to a employ pseudo-levitation method to enable the magnetic levitation disk 40 to maintain separation from the base plate 60.

The flywheel housing 22 defines a generally octagonal outer profile having a plurality of apexes or corners 22a, although any suitable outer profile may be utilized. A plurality of through-bores 22b is formed through opposed upper and lower surfaces 22c and 22d adjacent each corner 22a and each is configured to selectively receive a corresponding securement bolt of the plurality of securement bolts 130, as will be described in further detail hereinbelow. Although generally described as being disposed adjacent each corner of the plurality of corners 22a, it is contemplated that the plurality of through-bores 22b may be defined at any suitable location and may include any suitable number of through-bores.

A gasket 32 is interposed between each flywheel housing 22 to form a vacuum tight seal between each flywheel housing 22. In embodiments, each of the upper and lower surfaces 22c, 22d of the flywheel housing 22 may include a recess or groove (not shown) that is configured to receive a respective gasket 32 to locate or otherwise inhibit movement of the gasket 30 relative to each flywheel housing 22.

The vacuum plate 70 includes a generally octagonal outer profile, although it is contemplated that the vacuum plate may include any suitable profile and may be the same or different than the outer profile of the flywheel housing 22 of the flywheel segments 20. The vacuum plate includes an outer surface 70a extending between opposed upper and lower surfaces 70b and 70c, respectively. A boss 72 is disposed at a center portion of the upper surface 70b and extends longitudinally therefrom terminating at a top surface 72a. A through-hole 74 is defined through the top surface 72a and extends through the lower surface 70c. The through-hole 74 includes an inner dimension that is configured to slidably and rotatably receive a portion of the flywheel shaft 30 and a portion of the motor coupling 80 therein. A pair of opposed counterbores 72b is defined in the top surface 72a and the lower surface 70c respectively and each is concentric with the through-hole 74. The pair of opposed counterbores 72b is configured to retain a corresponding pair of bushings or bearings 76 therein using any suitable means, such as interference fit, friction fit, adhesives, mechanical fasteners, etc. It is contemplated that the bearings 76 may be bronze bushings (plain, oiled, grease grooved, graphite plugged, etc.), ball bearings (steel, ceramic, tungsten carbide, etc.), hydrodynamic bearings, hydrostatic bearings, magnets, etc., and combinations thereof. In one non-limiting embodiment, the bearings 76 are ball bearings.

An annular groove 70d is defined within the upper surface 70b at a center portion thereof and substantially concentric with the boss 72 and terminating at an annular surface 70e. The annular groove 70d is configured to rotatably receive a portion of the motor coupling 80 as will be described in further detail hereinbelow. In embodiments, one or more cut-outs or slots (not shown) may be defined through the annular surface 70e and extending through the lower surface 70c to act as a plurality of stators or steel poles in a magnetic gear formed by the magnetic coupling 50 and the motor coupling 80, as will be described in further detail hereinbelow.

A vacuum port (not shown) is defined through the top surface 70b of the vacuum plate 70 and extends through the lower surface 70c thereof. A vacuum pump 120 is coupled to a portion of the vacuum plate 70 and is in fluid communication with the vacuum port. The vacuum pump 120 may be any suitable vacuum pump capable of evacuating air from a cavity or vessel, and in embodiments, where an ultra-high vacuum (UHV) environment is required, the vacuum pump 120 may be an turbomolecular pump, a diffusion pump, or an ion pump to evacuate gas molecules off-gassed from the materials within the flywheel assembly 10. As can be appreciated, the vacuum generated by the vacuum pump 120 reduces drag on the plurality of flywheels 24 as they rotate and enhances the efficiency of the magnetic coupling strength between the magnetic coupling 50 and the motor coupling 80.

The vacuum plate 70 is formed from a non-magnetic material to minimize magnetic interference between the magnetic coupling 50 and the motor coupling 80 and enhance the efficiency of the magnetic coupling strength between the magnetic coupling 50 and the motor coupling 80. It is envisioned the vacuum plate may be formed from a non-metallic material, such as a ceramic, a polymer, etc., a metallic material such as aluminum, brass, titanium, etc., or any material having suitable strength and non-magnetic properties.

Continuing with FIGS. 1 and 2, the motor coupling 80 includes a generally circular profile having an outer surface 80a extending between opposed upper and lower surfaces 80b and 80c, respectively. Although generally described has having a circular profile, it is contemplated that the motor coupling 80 may include any suitable profile, such as hexagonal, octagonal, square, oval, etc. and may be the same or different that the profile of the magnetic coupling 50 and/or flywheels 24.

The outer surface 80a of the motor coupling 80 defines an annular flange 82 extending radially outward therefrom and adjacent the upper surface 80b. The annular flange 82 extends from the upper surface 80b towards the lower surface 80c and terminates at an annular surface 82a. A boss 84 is disposed on the upper surface 80b at a center portion thereof and is configured to couple to or otherwise engage a corresponding portion of a motor or generator to effectuate rotation of the motor coupling 80 as will be described in further detail hereinbelow. A counterbore 86 is defined through the lower surface 80c extending towards the upper surface 80b and terminating at an inner surface 86a. A protuberance 88 is disposed on the inner surface 86a of the counterbore 86 and extends towards the lower surface 80c. The protuberance 88 includes an outer dimension that is configured to be received within a portion of a bearing 76 of the vacuum plate 70 such that the motor coupling 80 is permitted to rotate relative to the vacuum plate 70. The protuberance 88 may be received within the portion of the bearing 76 by any suitable means, such as interference fit, friction fit, adhesives, mechanical fasteners, etc.

The lower surface 80c of the motor coupling 80 include a plurality of recesses 80d defined therein configured to receive a corresponding plurality of torque magnets 90 therein. The plurality of torque magnets 90 of the motor coupling 80 is arranged in a circumferential manner to enable the plurality of torque magnets 90 to act as a magnetic gear element in cooperation with the plurality of torque magnets 54 of the magnetic coupling 50. In this manner, each torque magnet of the plurality of torque magnets 90 of the motor coupling 80 is arranged in an alternating fashion, e.g., a pole of each respective magnet of the plurality of torque magnets 90 alternates in a north, south, north, south, etc. fashion such that rotation of the motor coupling 80 causes the plurality of torque magnets 90 to repel and attract the plurality of torque magnets 54 of the magnetic coupling 50, thereby effectuating a corresponding rotation of the magnetic coupling 50.

The magnetic coupling force between the plurality of torque magnets 90 of the motor coupling 80 and the plurality of torque magnets 54 of the magnetic coupling 50 acts as an axial-gap magnetic gear. In embodiments, the plurality of torque magnets 90 of the motor coupling 80 may include the same or different number of magnets as the plurality of torque magnets 54 of the magnetic coupling 50 depending upon the design needs of the flywheel assembly 10. It is contemplated that the number of slots defined through the vacuum plate 70 may be increased or decreased depending upon the design needs of the flywheel assembly 10.

The top plate 100 includes a profile generally similar to that of the flywheel housing 22 of the flywheel segment 20, although it is contemplated that the top plate 100 may include any suitable profile, such as hexagonal, circular, oval, square, etc. The top plate 100 is generally planar and includes an aperture 102 defined longitudinally through a center portion thereof that is configured to receive a portion of the boss 84 of the motor coupling 80 such that the motor coupling 80 may be operably coupled to a motor or generator using any suitable means, such as a spline, belt, gear, coupling, mechanical fasteners, etc., as will be described in further detail hereinbelow. A penetration 104 is defined longitudinally through the top plate 100 that is configured to receive electrical and/or communication wires therethrough. An electrical connector 106 is disposed within or over the penetration 104 and may be a bulkhead connector, surface connector, etc. In this manner, electrical wires (not shown) are operably coupled to a portion of the vacuum pump 120 at a first end portion thereof and are operably coupled to a portion of the electrical connector 106 at a second end portion thereof to electrically couple the electrical connector 106 to the vacuum pump 120. In embodiments, the electrical connector 106 may be a pass-through connector such that electrical wires operably coupled to the vacuum pump 120 may pass through the electrical connector and be operably coupled to an electrical device remote from the flywheel assembly 10.

With continued reference to FIGS. 1 and 2, each of the base plate 60, the flywheel housings 22, vacuum plate 70, and top plate 100 are coupled to one another using the plurality of securement bolts 130. In this manner, a gasket 32 is interposed between each of the base plate 60, the flywheel housings 22, the vacuum plate, and the top plate 100 and the plurality of securement bolts 130 is advanced within corresponding through-holes of each. Once the plurality of securement bolts 130 is fully advanced within each through-hole, a corresponding plurality of nuts or other suitable mechanism is utilized to tighten and otherwise seal the base plate 60, flywheel housings 22, vacuum plate 70, and top plate 100 together to form a vacuum tight seal. Although generally described as being a bolt, it is contemplated that the plurality of securement bolts 130 may be threaded rods, screws, or any suitable mechanism for coupling one or more components to one another.

Turning to FIG. 2, an embodiment with two or more flywheel assemblies 10 coupled together is illustrated and generally identified by reference numeral 200. Although generally illustrated as having two flywheel assemblies 10, it is contemplated that the flywheel assembly 200 may include any number of flywheel assemblies 10 depending upon design needs and the amount of energy storage required.

The flywheel assembly 200 includes a first, upper flywheel assembly 210a and a second, lower flywheel assembly 210b. The upper flywheel assembly 210a is substantially similar to the flywheel assembly 10 described hereinabove except that the flywheel shaft 30 includes an internal spline 230a that is configured to receive a corresponding external spline 230b of a flywheel shaft 30 of the lower flywheel assembly 210b such that rotation of the flywheel shaft 30 of the upper flywheel assembly 210a effectuates a corresponding rotation of the flywheel 30 of the lower flywheel assembly 210b. Further, it is contemplated that the base plate 60 of the upper flywheel assembly 210a may include one or more vacuum ports (not shown) defined through the upper and lower surfaces 260a, 260b such that the vacuum pump 120 may cause a vacuum within both the upper flywheel assembly 210a and the lower flywheel assembly 210b.

The lower flywheel assembly 210b is substantially similar to the flywheel assembly 24 described hereinabove except that the lower flywheel assembly 210b does not include a magnetic coupling 50, a vacuum plate 70, a motor coupling 80, and a top plate 100. The upper most flywheel housing 222 of the lower flywheel assembly 210b is coupled to the base plate 260 of the upper flywheel assembly 210a using a plurality of bolts Turning to FIGS. 3-6, it is contemplated that the flywheel assembly 10 may not include a flywheel shaft 30. In this manner, each flywheel 24 includes an annular groove 1000 defined in the upper and lower surfaces 24a, 24b in which a centering ring or key 1002 is disposed. It is contemplated that the centering ring 1002 may be received within the annular groove 1000 using any suitable means, such as interference fit, friction fit, welding, adhesives, mechanical fasteners, etc. and in one non-limiting embodiment, the centering ring 1002 is secured within the annular groove by a press fit.

The outer wall 24c of each flywheel 24 includes a plurality of channels 24g defined therein and extending longitudinally and through each of the upper and lower surfaces 24a, 24b of the flywheel. The plurality of channels 24f is configured to receive a respective tie bar 1004 therein. The tie bars 1004 are configured to fixedly couple each flywheel 24 to one another such that each flywheel 24 is inhibited from separating longitudinally from one another. It is contemplated that the tie bars 1004 may be coupled to the flywheels 24 using any suitable means, such as mechanical fasteners, welding, adhesives, etc.

Figure 4:
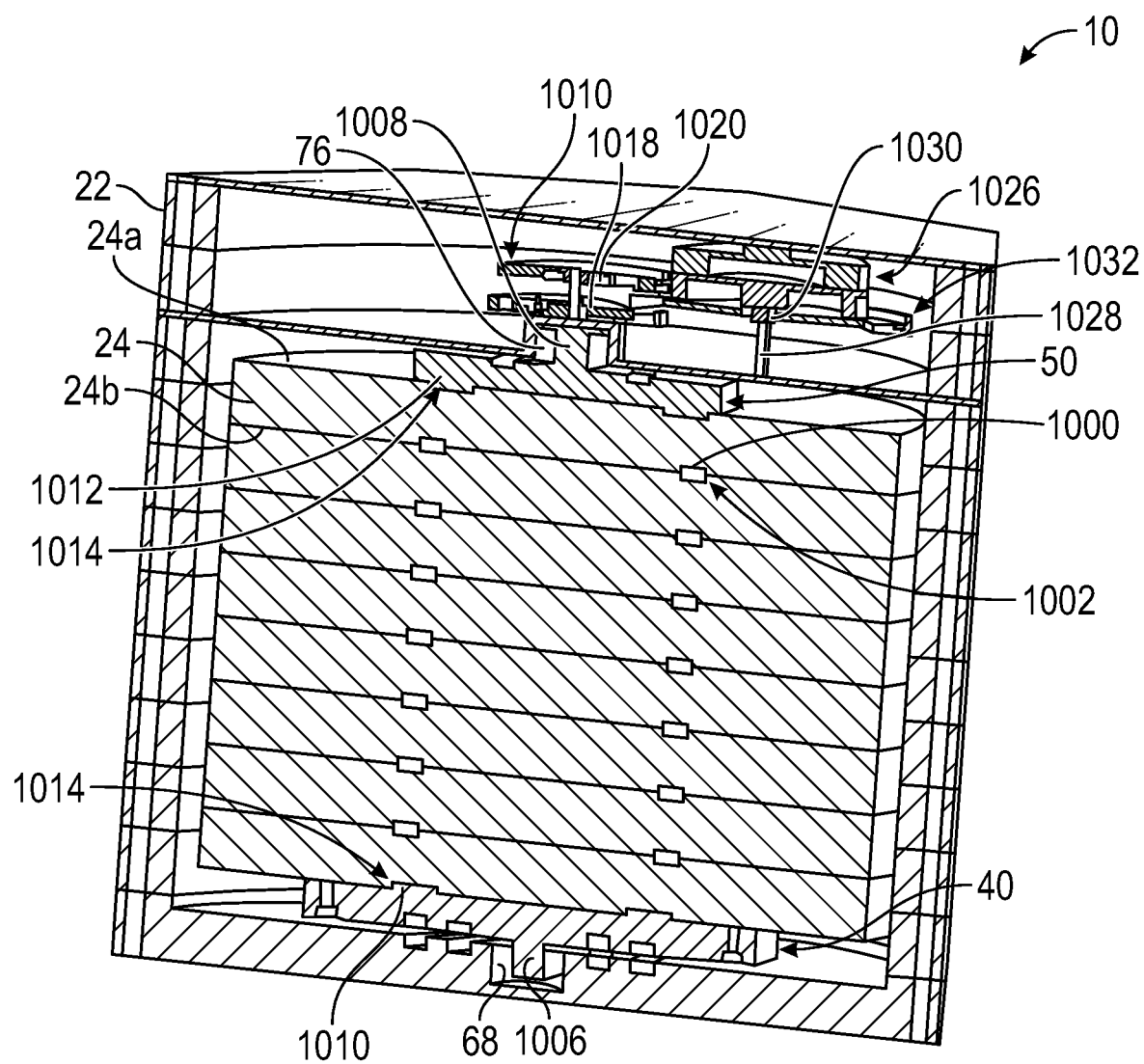
FIG. 4 is a cross-sectional view of the flywheel assembly of FIG. 3.

In the instance where the flywheel assembly 10 does not include a flywheel shaft 30, it is envisioned that the magnetic levitation disk 40 and the magnetic coupling 50 may include a respective boss 1006 and 1008 disposed thereon that are configured to be received within the bearings 68 of the base plate 60 and the bearings 76 of the vacuum plate 70. With reference to FIG. 4, each of the magnetic levitation disk 40 and the magnetic coupling 50 include an annular boss 1010 and 1012 disposed on the upper surface 50a and lower surface 40b thereof, respectively. Each of the annular bosses 1010, 1012 of the magnetic levitation disk 40 and the magnetic coupling 50, respectively, is configured to be received within a respective annular groove 1014 defined in each respective adjacent flywheel 24 to axially align each of the magnetic levitation disk 40 and the magnetic coupling 50 with the flywheels 24. It is envisioned that the magnetic levitation disk 40 and the magnetic coupling 50 may be fixedly coupled to each respective adjacent flywheel 24 using any suitable means, such as mechanical fasteners, interference fit, welding, adhesives, etc.

Figure 5:
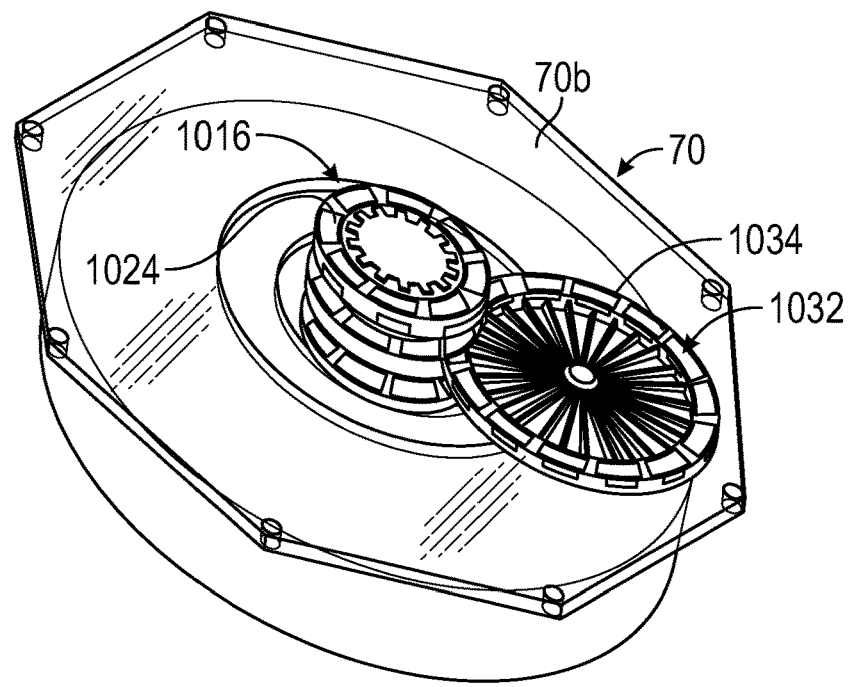
FIG. 5 is a top, perspective view of a magnetic gear assembly of the flywheel assembly of FIG. 3.
Figure 6:
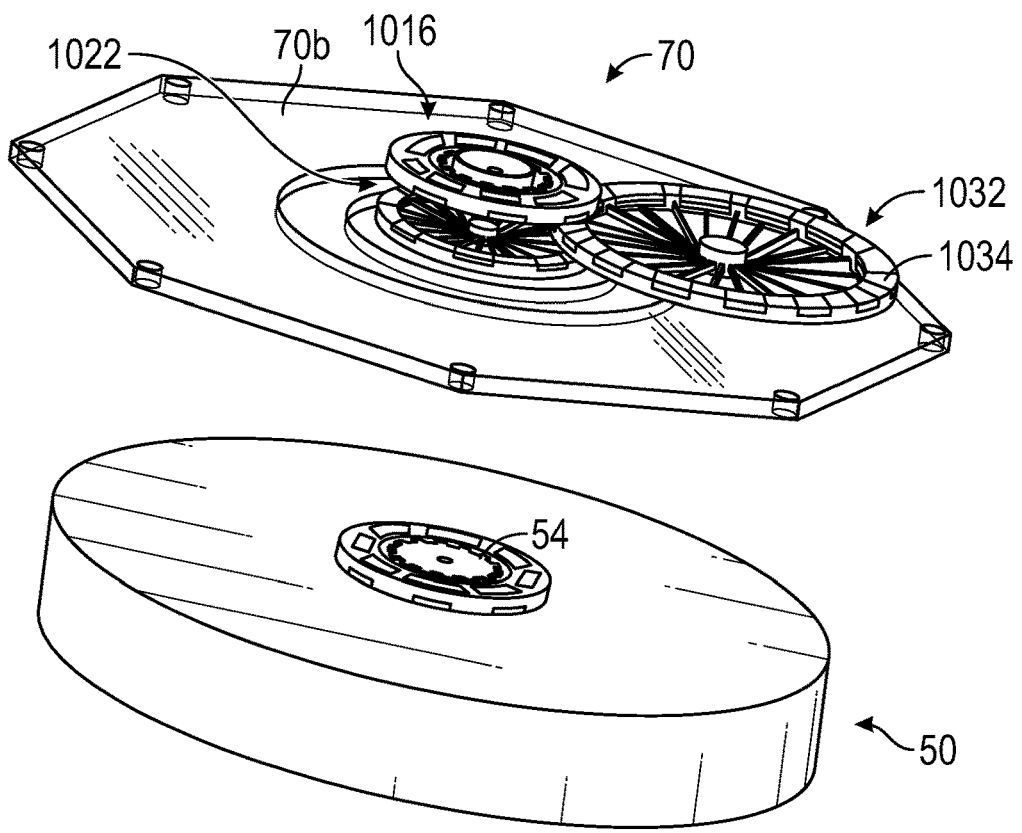
FIG. 6 is a perspective view of the magnetic gear assembly of FIG. 5.

With reference to FIGS. 4-6, it is contemplated that the flywheel assembly 10 may include a pair of magnetic gears 1016 rotatably supported on the upper surface 70b of the vacuum plate 70 using any suitable means, such as a shaft or spindle 1018. In this manner, it is contemplated that the spindle 1018 may be fixedly secured to a center portion of the upper surface 70b of the vacuum plate 70 using any suitable means, such as welding, adhesives, interference fit, friction fit, mechanical fasteners, etc. In this manner, each of the pair of magnetic gears 1016 may include a bearing or bushing 1020 coupled thereto and configured to receive a portion of the spindle therein thereby enabling the pair of magnetic gears 1016 to rotate about the spindle 1018. In embodiments, the spindle 1018 may be rotatably supported on the upper surface 70b of the vacuum plate 70 using bearings, bushings, etc. In this manner, the pair of magnetic gears 1016 may be fixedly coupled to the spindle 1018 using any suitable means, such as interference fit, friction fit, welding, adhesives, mechanical fasteners, etc. such that the pair of magnetic gears 1016 and the spindle 1018 rotate in unison within the bearings disposed in the vacuum plate 70.

The pair of magnetic gears 1016 are axially aligned and longitudinally spaced apart from one another such that a gap 1022 is defined therebetween. Each of the pair of magnetic gears 1016 includes a plurality of torque magnets 1024 therein. The plurality of torque magnets 1024 of the pair of magnetic gears 1016 is arranged in a circumferential manner to enable the plurality of torque magnets 1024 to act as a magnetic gear element in cooperation with the plurality of torque magnets 54 of the magnetic coupling 50. In this manner, each torque magnet of the plurality of torque magnets 1024 of the pair of magnetic gears 1016 is arranged in an alternating fashion, e.g., a pole of each respective magnet of the plurality of torque magnets 1024 alternates in a north, south, north, south, etc. fashion such that rotation of the pair of magnetic gears 1016 causes the plurality of torque magnets 1024 to repel and attract the plurality of torque magnets 54 of the magnetic coupling 50, thereby effectuating a corresponding rotation of the magnetic coupling 50.

The magnetic coupling force between the plurality of torque magnets 1024 of the pair of magnetic gears 1016 and the plurality of torque magnets 54 of the magnetic coupling 50 acts as an axial-gap magnetic gear. In embodiments, the plurality of torque magnets 1024 of the pair of magnetic gears 1016 may include the same or different number of magnets as the plurality of torque magnets 54 of the magnetic coupling 50 depending upon the design needs of the flywheel assembly 10.

In embodiments, the flywheel assembly 10 may include a motor coupling gear 1026 rotatably supported on the upper surface 70b of the vacuum plate 70 using any suitable means, such as a shaft or spindle 1028. In this manner, it is contemplated that the spindle 1028 of the motor coupling gear 1026 may be fixedly secured to a portion of the upper surface 70b of the vacuum plate 70 at a location that is radially offset from the pair of magnetic gears 1016 using any suitable means, such as welding, adhesives, interference fit, friction fit, mechanical fasteners, etc. In this manner, the motor coupling gear 1026 may include a bearing or bushing 1030 coupled thereto and configured to receive a portion of the spindle 1028 therein thereby enabling the motor coupling gear 1026 to rotate about the spindle 1028. In embodiments, the spindle 1028 of the motor coupling gear 1026 may be rotatably supported on the upper surface 70b of the vacuum plate 70 using bearings, bushings, etc. In this manner, the magnetic coupling gear 1026 may be fixedly coupled to the spindle 1028 using any suitable means, such as interference fit, friction fit, welding, adhesives, mechanical fasteners, etc. such that the motor coupling gear 1026 and the spindle 1028 rotate in unison within the bearings disposed in the vacuum plate 70.

The motor coupling gear 1026 includes a radial flange 1032 disposed thereon and extending radially therefrom. The radial flange 1032 of the motor coupling gear 1026 is configured to be received within the gap 1022 defined between the pair of magnetic gears 1016 and includes a plurality of torque magnets 1034 disposed thereon. The plurality of torque magnets 1034 of the motor coupling gear 1026 is arranged in a circumferential manner to enable the plurality of torque magnets 1034 to act as a magnetic gear element in cooperation with the plurality of torque magnets 1024 of the pair of magnetic gears 1016. In this manner, each torque magnet of the plurality of torque magnets 1034 of the moto coupling gear 1026 is arranged in an alternating fashion, e.g., a pole of each respective magnet of the plurality of torque magnets 1034 alternates in a north, south, north, south, etc. fashion such that rotation of the motor coupling gear 1026 causes the plurality of torque magnets 1034 to repel and attract the plurality of torque magnets 1024 of the pair of magnetic gears 1016, thereby effectuating a corresponding rotation of the pair of magnetic gears 1016.

The magnetic coupling force between the plurality of torque magnets 1034 of the motor coupling gear 1026 and the plurality of torque magnets 1024 of the pair of magnetic gears 1016 acts as an axial-gap magnetic gear. In embodiments, the plurality of torque magnets 1034 of the motor coupling gear 1026 may include the same or different number of magnets as the plurality of torque magnets 1024 of the pair of magnetic gears 1016 depending upon the design needs of the flywheel assembly 10. As can be appreciated, the motor coupling gear is configured to couple to or otherwise engage a corresponding portion of a motor or generator to effectuate rotation of the motor coupling gear 1026.

Figure 7:
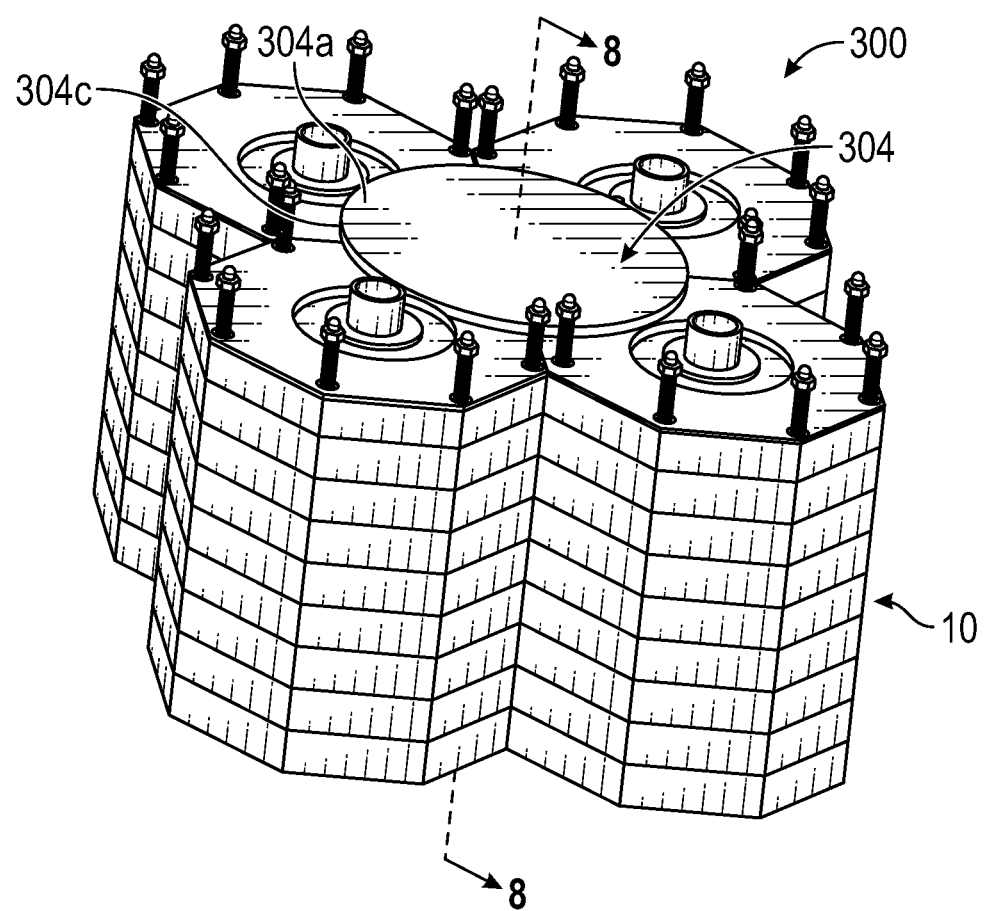
FIG. 7 is a perspective view of a flywheel pod including four flywheel assemblies of FIG. 1.
Figure 8:
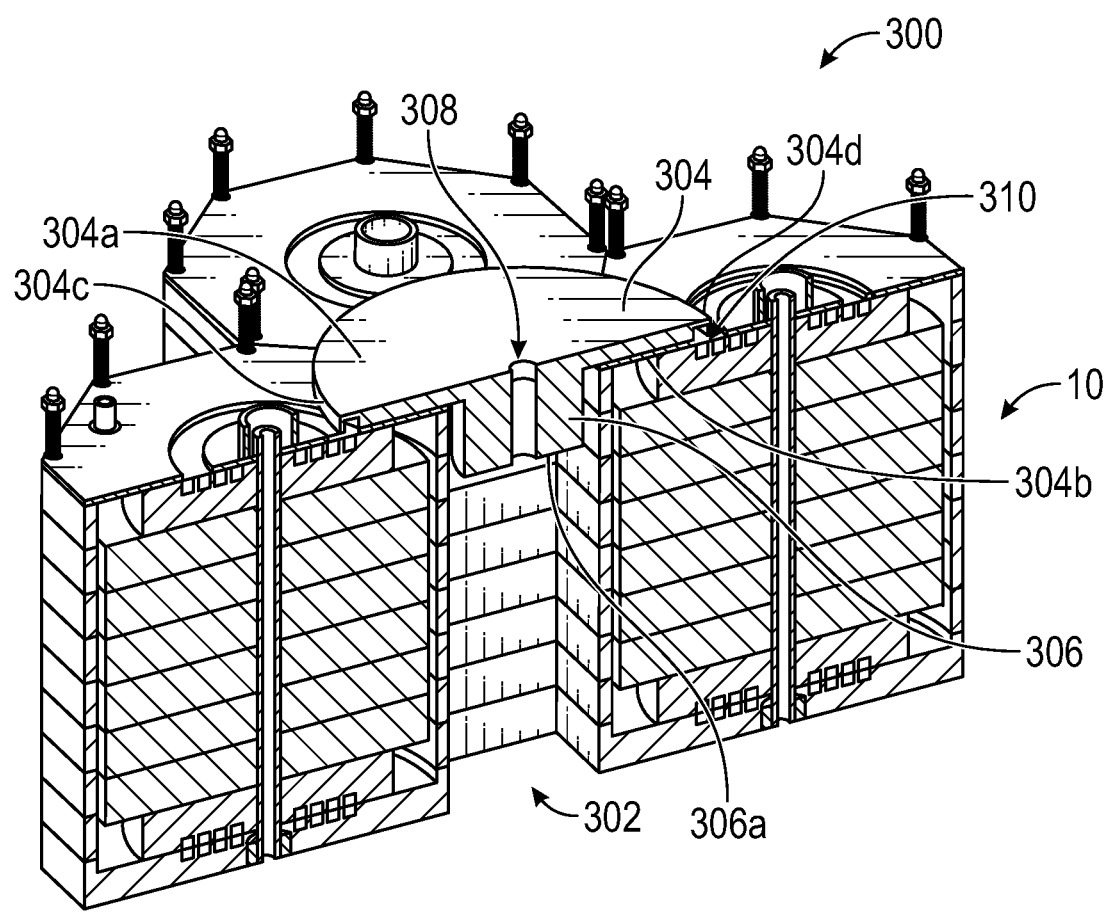
FIG. 8 is a cross-sectional view of the flywheel pod of FIG. 7 taken along section line 8-8 of FIG. 7.

With reference to FIGS. 7 and 8, a pod 300 of flywheel assemblies 10 is illustrated. The pod 300 includes two or more flywheel assemblies 10 disposed adjacent and spaced apart from one another to define a channel 302 therebetween. It is contemplated that the pod 300 may include any suitable number of flywheel assemblies 10, such as three, four, five, six, etc. and in one non-limiting embodiment includes four flywheel assemblies 10. The flywheel assemblies 10 are disposed in a circular pattern such that the center channel 302 is defined at a center portion thereof. In embodiments, any suitable pattern defining a center channel 302 may be utilized, such as square, oval, hexagonal, pentagonal, octagonal, etc.

Each flywheel assembly 10 of the pod 300 is substantially similar to the flywheel assembly 10 described hereinabove except that each flywheel assembly 10 of the pod 300 does not include a motor coupling 80 or top plate 100. The pod 300 includes a central motor coupling 304 rotatably disposed at least partially within the center channel 302. The central motor coupling 304 defines a generally circular profile having opposed upper and lower surfaces 304a and 304b, respectively, and an outer surface 304c extending longitudinally therebetween. A boss 306 is disposed on the lower surface 304b of the central motor coupling 304 and extends longitudinally therefrom and terminating at an end surface 306a. A bore 308 is defined through the upper surface 304a and extends through the end surface 306a. The bore 308 is configured to be coupled to a motor or generator (not shown) such that rotation of the motor effectuates a corresponding rotation of the central motor coupling 304. It is contemplated that the motor may be coupled to the central motor coupling 304 using any suitable means, such as a spline, interference fit, friction fit, adhesives, welding, mechanical fasteners, etc.

The lower surface 304b of the central motor coupling 304 includes a plurality of recesses 304d defined therein configured to receive a corresponding plurality of torque magnets 310 therein. The plurality of torque magnets 310 of the central motor coupling 304 is arranged in a circumferential manner to enable the plurality of torque magnets 310 to act as a magnetic gear element in cooperation with the plurality of torque magnets 54 of the magnetic coupling 50 of each of the flywheel assemblies 10 of the pod 300. In this manner, each torque magnet of the plurality of torque magnets 310 of the central motor coupling 304 is arranged in an alternating fashion, e.g., a pole of each respective magnet of the plurality of torque magnets 310 alternates in a north, south, north, south, etc. fashion such that rotation of the central motor coupling 304 causes the plurality of torque magnets 310 to repel and attract the plurality of torque magnets 54 of the magnetic coupling 50 of each respective flywheel assembly 10, thereby effectuating a corresponding rotation of the magnetic coupling 50 of each respective flywheel assembly 10.

The magnetic coupling force between the plurality of torque magnets 310 of the central motor coupling 304 and the plurality of torque magnets 54 of the magnetic coupling 50 acts as an axial-gap magnetic gear. In embodiments, the plurality of torque magnets 310 of the central motor coupling 304 may include the same or different number of magnets as the plurality of torque magnets 54 of the magnetic coupling 50 depending upon the design needs of the flywheel assembly 10.

In one embodiment, the flywheel pods 300 are encased in concrete. This can mitigate some of the moisture and environmental needs of the flywheel pods. Further, such a configuration is particularly suited for placement in underground levels of buildings and other structures and prevents them from being vandalized otherwise damaged.

Figure 9:
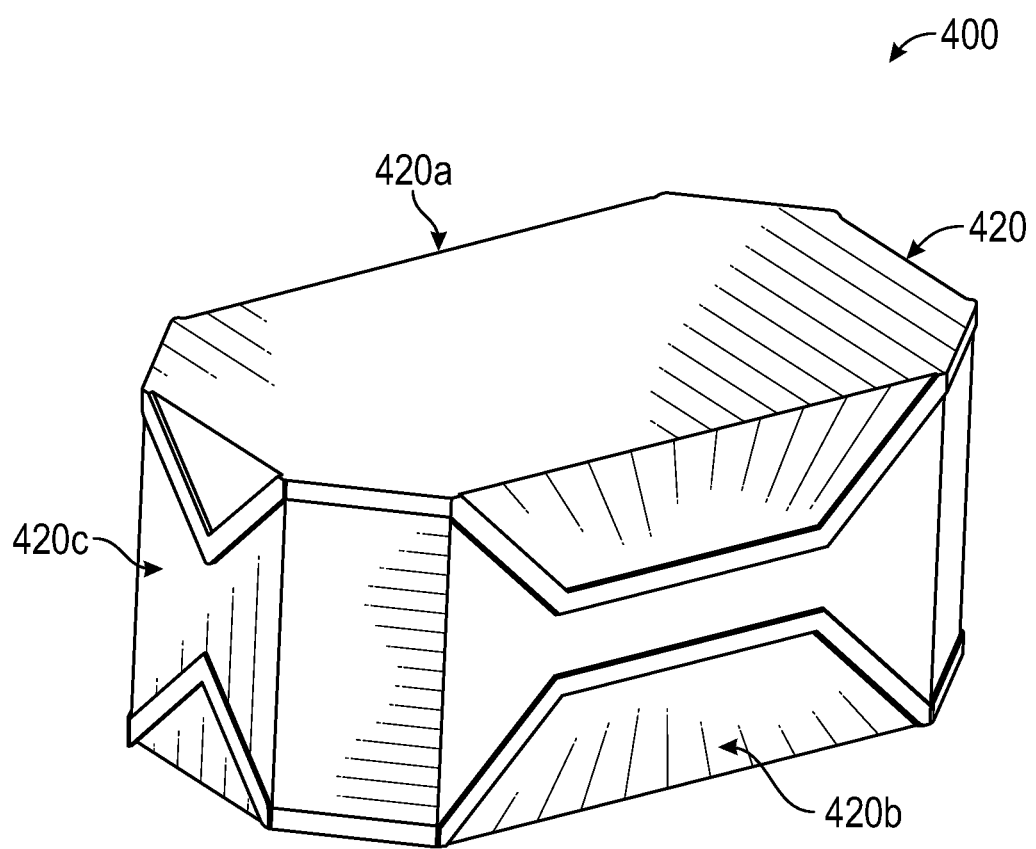
FIG. 9 is a perspective view of a housing of a renewable energy generation system provided in accordance with the present disclosure.
Figure 10:
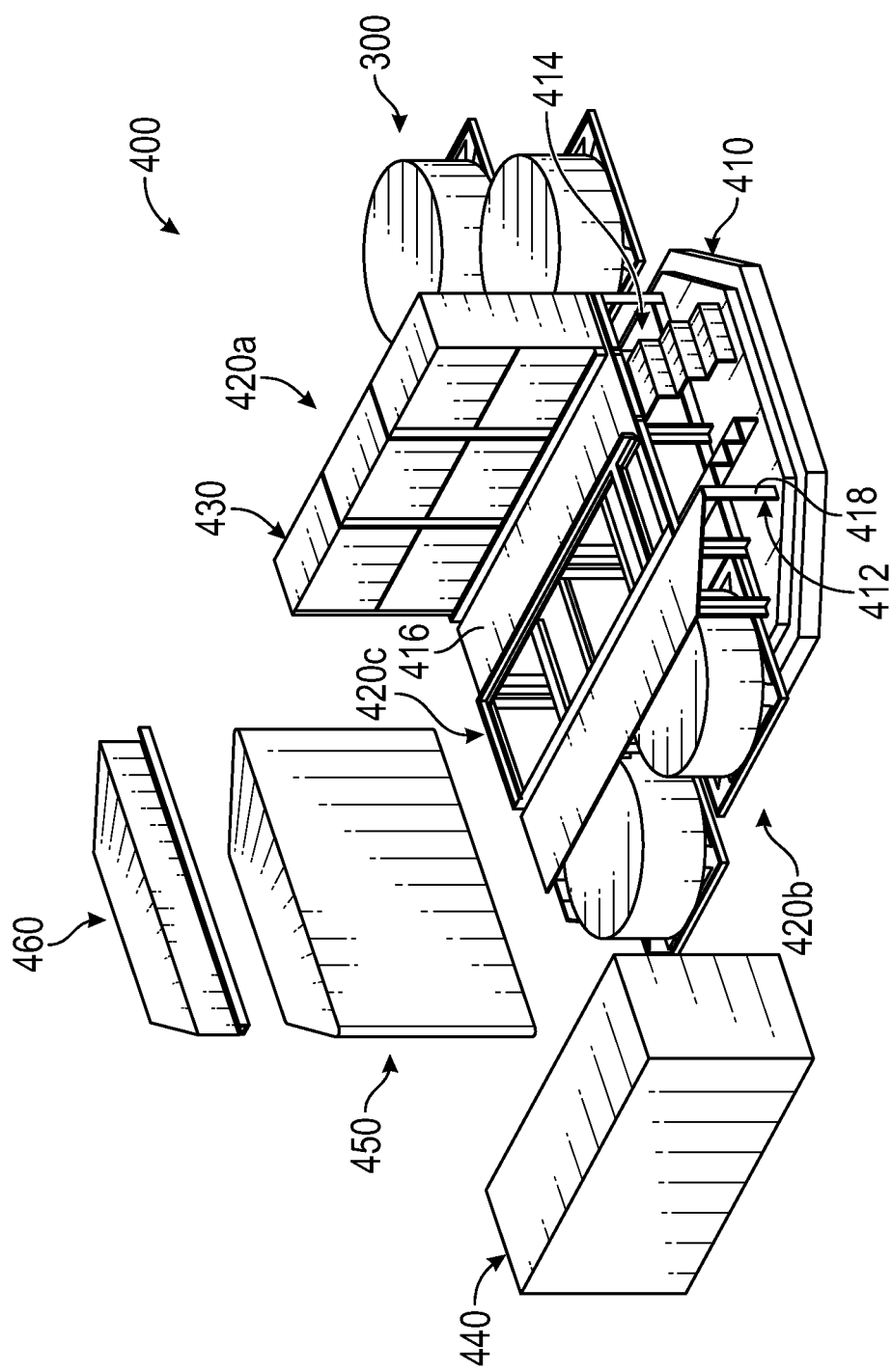
FIG. 10 is an exploded, perspective view of an interior portion of the housing of FIG. 9.
Figure 11:
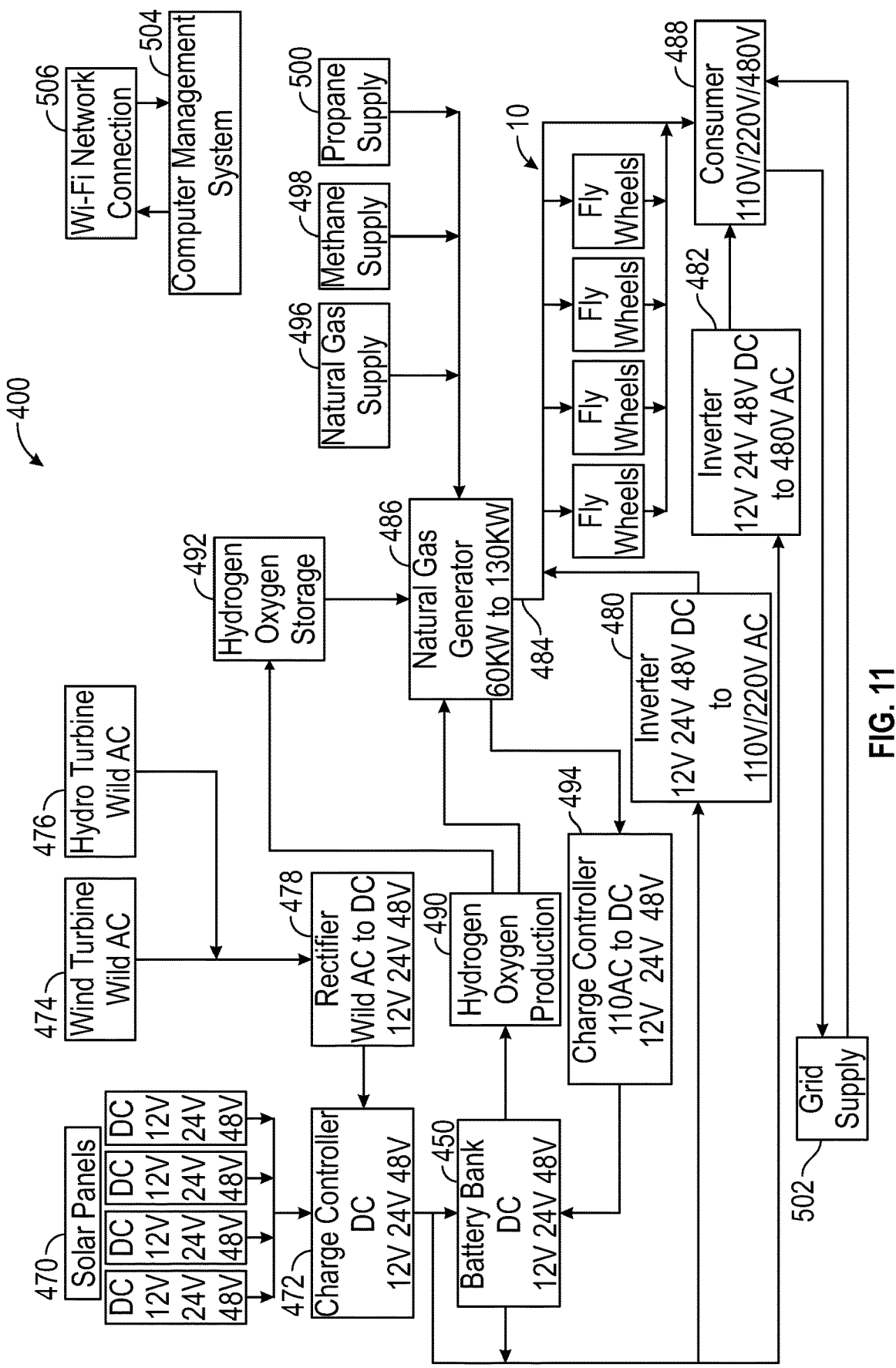
FIG. 11 is a schematic view of the renewable energy generation system of FIG. 9.

With reference to FIGS. 9-11, a renewable energy generation system in which the flywheel assemblies 10 is utilized is illustrated and generally identified by reference numeral 400. The renewable energy generation system 400 includes a foundation 410, a housing 420 in which hydrogen generators 430, a propane generator 440, a battery storage compartment 450, a reserve water tank 460, and flywheel pods 300 are disposed.

The frame or superstructure 412 is disposed on the foundation 410, such as a concrete foundation, steel foundation, stone foundation, etc. The frame 412 defines a plurality of cavities 414 between the foundation 410 and a support floor 416 spaced apart from the foundation 410 and supported by a plurality of beams 418. Each cavity of the plurality of cavities 414 is configured to receive a corresponding flywheel pod 300. It is envisioned that the flywheel pods 300 may be disposed on a rolling tray or structure that is configured to permit the flywheel pods 300 to be easily removed from or advanced within a respective cavity of the plurality of cavities 414.

The support floor 416 supports the hydrogen generators 430 at a first side 420a of the housing 420 and the propane generators 440 at an opposite, second side 420b of the housing 420. The hydrogen generators 430 and the propane generators 440 are each disposed over a corresponding set of flywheel pods 300 such that each of the hydrogen generators 430 and propane generators 440 may be operably coupled to respective central motor couplings 304 of each respective flywheel pod 300. In this manner, rotation of a portion of the hydrogen generators 430 and a portion of the propane generators 440 effectuates a corresponding rotation of each flywheel assembly 10 within each respective flywheel pod 300 to store rotational energy. Although generally described as being a hydrogen generator and a propane generator, it is contemplated that the system 400 may include any suitable type of generator, such as electric, gasoline, diesel, solar powered, etc.

The support floor 416 supports the battery storage compartment 450 at a first end portion 420c of the housing 420 (e.g., that is opposite an entrance to the housing 420) and is interposed between the hydrogen generator 430 and the propane generator 440. The battery storage compartment 450 includes a plurality of batteries disposed therein that is operably coupled to each of the hydrogen generator 430, the propane generator 440, and the plurality of flywheel pods 300 such that energy generated and/or stored by each of the hydrogen generator 430, the propane generator 440, and the plurality of flywheel pods 300 may be stored therein for selective discharge. The reserve water tank 460 is disposed on the battery storage compartment 450 and is configured to store water therein. The reserve water tank 460 is operably coupled to the hydrogen generator 430 such that when the hydrogen generator 430 requires additional water, the hydrogen generator 430 may draw water from the reserve water tank 460.

Turning to FIG. 11, a schematic view of the renewable energy generation system 400 is illustrated. The renewable energy generation system 400 includes one or more solar panels 470 operably coupled to a first charge controller 472. In embodiments, the renewable energy generation system 400 also includes one or more wind turbines 474 and/or one or more hydrodynamic turbines 476. The wind turbines and hydrodynamic turbines are operably coupled to a rectifier 478, which in turn, is operably coupled to the first charge controller 472. The first charge controller 472 is operably coupled to the battery storage compartment or battery bank 450 such that electrical energy generated by the solar panels 470, the wind turbines 474, and/or the hydrodynamic turbines 476 may be stored therein.

The battery storage compartment 450 is operably coupled to a first inverter 480 and a second inverter 482, each of which is configured to convert the Direct Current (DC) electrical energy stored within the battery storage compartment 450 into Alternating Current (AC) electrical energy. The first inverter 480 is operably coupled to an electrical energy output 484 of the generator, which may be a hydrogen generator 430, a propane generator 440, a natural gas generator 486, etc. In one non-limiting embodiment, the generator is a natural gas generator 486. The electrical energy output 484 is operably connected to a consumer 488 (e.g., meter box, service, etc.). The second inverter 482 is operably coupled to the consumer 488, such that electrical energy stored within the battery storage compartment 450 may be directly transmitted to the consumer 488.

The battery storage compartment 450 is operably coupled to a hydrogen oxygen production module 490, which in turn, is operably coupled to the natural gas generator 486 and a hydrogen oxygen storage compartment 492. As can be appreciated, the hydrogen oxygen storage compartment 492 stores excess hydrogen and oxygen, or in embodiments, oxyhydrogen, which may be selectively drawn by the natural gas generator 486. A portion of the electrical energy generated by the natural gas generator 486 may be transmitted to a second charge controller 494, which in turn, is operably coupled to the battery storage compartment 450 such that electrical energy generated by the natural gas generator 486 may be stored within the battery storage compartment 450.

In embodiments, the renewable energy generation system 400 may include one or more of a natural gas supply 496, a methane supply 498, and/or a propane supply 500. Each of the natural gas supply 496, the methane supply 498, and the propane supply 500 is operably coupled to the natural gas generator 486 to provide fuel thereto.

It is envisioned that the consumer 488 may be operably coupled to an electrical grid 502. In this manner, the consumer 488 may draw electrical energy from the grid 502, or in instances where the renewable energy generation system 400 generates excess electrical energy (e.g., more electrical energy than is being utilized by the consumer or when the battery storage compartment is fully charged), the excess electrical energy may be transmitted from the consumer back into the grid. In this manner, the renewable energy generation system 400 includes a computer management system 504 having a wireless (WiFi) transmitter or wireless network connection 506 operably coupled thereto. In this manner, the computer management system 504 may communicate wirelessly to a remote computer or user device such that a user may monitor or otherwise control the renewable energy generation system 400 remotely. The wireless transmitter 506 may be any suitable wireless transmitter capable of wirelessly transmitting communication data to a remote computer or user device (not shown), such as a WiFi transmitter conforming to IEEE standards or any other suitable wireless protocol. The wireless transmitter 506 is in electrical communication with the computer management system 506, such that information pertaining to the operation of the renewable energy generation system 400 that is collected by a processor associated with the computer management system 504 may be wirelessly transmitted by the wireless transmitter 506 to the remote computer or user device.

In this manner, alarms and/or messages generated by the processor of the computer management system 504 are wirelessly transmitted by the wireless transmitter 506 and received by the computer or user device to alert a user to a fault in the renewable energy generation system 400.

In embodiments, the computer management system 504 monitors the renewable energy generation system 400, and in particular, the battery storage compartment 450, the natural gas generator 486, the flywheel assemblies 10, etc., and controls how the generated energy is stored, utilized, and/or generated. In embodiments, the computer management system 504 directs the renewable energy generation system 400 to deliver electrical energy to the consumer 488 solely from the battery storage compartment 450 if the load (e.g., electrical energy utilized by the consumer 488) is 10 kW or less. If the computer management system 504 identifies that the load increases to 9 kW, the computer management system 504 instructs the flywheel assemblies 10 to engage the natural gas generator 486 and generate electrical energy. As the load increases to over 10 kW, the computer management system 504 instructs the battery storage compartment 450 to stop transmitting electrical energy to the consumer 488 and receive electrical energy from the natural gas generator 486 via the energy provided by the flywheel assemblies 10 to charge the batteries within the battery storage compartment 450.

In embodiments, the computer management system 486 instructs the flywheel assemblies 10 to provide energy is the load is between 11 kW and 40 kW. If the computer management system 486 identifies that the load is 36 kW, it will instruct the natural gas generator 486 to operate and be in a ready state (e.g., be ready to provide electrical energy to the consumer 488). At a load of 41 kW, the computer management system 486 instructs the flywheel assemblies 10 to stop supplying energy and begin receiving energy from the natural gas generator 486 to charge the flywheel assemblies 10. At this point, at a load above 41 kW, the natural gas generator 486 provides all of the electrical energy to the consumer 488.

For a detailed description of an exemplary renewable energy generation system for use with the present disclosure, reference may be made to U.S. Patent Application Ser. No. 62/929,562, filed on Nov. 1, 2019, titled "Mechanical Renewable Green Energy Production," the entire content of which has been previously incorporated by reference hereinabove.

Turning now to FIGS. 12-15, a hydrogen generator system is illustrated and generally identified by reference numeral 600. The hydrogen generator system 600 includes a hydrogen generation system 602, an electrical generation system 700, and a computer management system 800 operably coupled to each of the hydrogen generation system 602 and the electrical generation system 700.

The hydrogen generation system 602 includes an electrical power supply 604 that is operably coupled to a hydrogen generator 606 such that electrical energy is supplied to the hydrogen generator 606 by the electrical power supply 604. It is contemplated that the electrical power supply 604 may be any suitable power supply capable of supplying electrical energy to the hydrogen generator 606 and the various components of the hydrogen generator system 600, and in embodiments, may supply 120VAC, 220VAC, 240VAC, a DC voltage such as 12VDC, 24VDC, 48VDC, etc.

The hydrogen generator 606 is configured to produce a hydrogen/oxygen gas mixture from a water supply (not shown) that is stored therewithin using electrical energy supplied by the electrical power supply 604. In this manner, the hydrogen generator 606 uses electrolysis to split the water into hydrogen and oxygen gas, which is usable by the hydrogen generator system 600 to generate electrical energy, as will be described in further detail hereinbelow. Although generally described as being an electrolysis hydrogen generator, it is contemplated that the hydrogen generator 606 may be any suitable method of generating hydrogen, such as chemically assisted electrolysis, radiolysis, thermolysis, thermochemical, ferrosilicon, photobiological water splitting, etc. In one non-limiting embodiment, the hydrogen generator 602 is a Proton Exchange Membrane (PEM) hydrogen generator.

The hydrogen-oxygen gas mixture generated by the hydrogen generator 606 is transmitted to a gas bubbler 608 using any suitable means, such as a gas line 610, amongst others. The gas bubbler 608 includes one or more chambers (not shown) defined therein that are partially filled with water. The hydrogen-oxygen mixture transmitted from the hydrogen generator 606 is fed into the water of each chamber of the gas bubbler 608 such that the hydrogen-oxygen gas mixture flows through the water and is captured in a vacant space (not shown) disposed above the waterline of each chamber of the gas bubbler 608. In this manner, the water disposed in the gas bubbler 608 acts as a filter to scrub impurities from the hydrogen-oxygen gas mixture and acts as a one-way valve such that the hydrogen-oxygen gas mixture is inhibited from flowing back towards the hydrogen generator 606. As can be appreciated, the one-way valve property of the gas bubbler 608 also serves as a flash arrestor and/or safety device to inhibit the propagation of fire towards the hydrogen generator 606. It is envisioned that the gas bubbler 608 may be any suitable gas bubbler capable of permitting gas to flow into and out of water, and in embodiments, may be an oil bubbler or a mercury bubbler depending upon the design needs of the hydrogen generation system 600.

The filtered hydrogen-oxygen gas mixture is transmitted from the gas bubbler 608 to one or more desiccant dryers 612 using the gas line 610. The desiccant dryers 612 remove moisture from the hydrogen-oxygen gas mixture as the hydrogen-oxygen gas mixture flows therethrough to ensure that the hydrogen-oxygen gas mixture is substantially free of moisture. It is contemplated that the desiccant dryer 612 may be an absorbent type or an adsorbent type, and in embodiments, may be a regenerative desiccant dryer. In embodiments, the desiccant dryers 612 may be operably coupled to the electrical power supply 604. As can be appreciated, the desiccant dryer 612 may also serve as a flash arrestor and safety device by inhibiting the propagation of fire towards the hydrogen generator 606. It is envisioned that the hydrogen generation system 602 may include any suitable number of desiccant dryers depending upon the design needs of the hydrogen generator system 600, such as one, two, three, etc.

The hydrogen-oxygen gas mixture is transmitted from the desiccant dryers 612 to a super-charger 614 via the gas line 610. An air intake 616 is operably coupled to the gas line 610 at a location interposed between the desiccant dryers 612 and the super-charger 614. In this manner, ambient air is introduced into the hydrogen-oxygen gas mixture via the air intake 616 and is mixed with the hydrogen-oxygen gas mixture within the super-charger 614. As can be appreciated, the amount of air mixed into the hydrogen-oxygen gas mixture is varied by the computer management system 800 to ensure that a predetermined amount of air is mixed with the hydrogen-oxygen gas mixture, as will be described in further detail hereinbelow. The super-charger 614 compresses the hydrogen-oxygen-air mixture using a compressor (not shown) that may be electrically or mechanically driven (e.g., electrical motor, an engine, etc.). It is envisioned that the super-charger 614 may be any suitable type of compressor capable of compressing the hydrogen-oxygen-air mixture to the desired pressure, such as a positive displacement compressor, a dynamic compressor, etc. In embodiments, the supercharger 614 is configured to compress the hydrogen-oxygen-air mixture to a pressure of 2 psi.

The compressed hydrogen-oxygen-air mixture is transmitted from the super-charger 614 to a storage chamber 618 via the gas line 610. The storage chamber 618 stores a predetermined amount of the hydrogen-oxygen-air mixture within a chamber (not shown) defined therein at a predetermined maximum pressure (e.g., 2 psi). In this manner, the hydrogen-oxygen-air mixture is compressed by the super-charger 614 against the pressure within the storage chamber 618. In embodiments, the storage chamber 618 includes a volume capable of storing an amount of the hydrogen-oxygen-air mixture to supply a combustion cylinder 626 for approximately 5-10 minutes, although it is contemplated that the storage chamber 618 may be any suitable size and any number of storage chambers 618 may be utilized to increase or decrease the amount of the hydrogen-oxygen-air mixture that can be stored.

The pressure within the storage chamber 618 is monitored by a pressure switch 620 that is operably coupled thereto. The pressure switch 620 is configured to send a first signal to the computer management system 800 once a predetermined upper pressure within the storage chamber 618 has been reached, which in turn, causes the hydrogen generator 606 to turn off or otherwise stop producing the hydrogen-oxygen gas mixture. The pressure switch 620 is configured to send a second signal to the computer management system 800 once a predetermined lower pressure has been reached, which in turn, causes the hydrogen generator 606 to turn on and otherwise start producing the hydrogen-oxygen gas mixture.

The hydrogen-oxygen-air mixture is transmitted to a fuel flow switch 622 that is operably coupled to the gas line 610. The fuel flow switch 622 is configured to selectively permit and selectively inhibit the flow of the hydrogen-oxygen-air mixture from the storage chamber 618 to the combustion cylinder 626. It is contemplated that the fuel flow switch 622 may be any suitable switch capable of selectively inhibiting and permitting the flow of a fluid therethrough, and in embodiments may be an electrically controlled valve. As can be appreciated, in the case of an emergency, the fuel flow switch 622 may be actuated by the computer management system 800 to close and inhibit the flow of the hydrogen-oxygen-air mixture from the storage chamber 618 to the combustion cylinder 626.

A pressure regulator 624 is operably coupled to the gas line 610 and is configured to regulate a pressure of the hydrogen-oxygen-air mixture that is supplied to the combustion cylinder 626. It is contemplated that the pressure regulator 624 may be any suitable pressure regulator capable of regulating a pressure of a gas, and in embodiments, the pressure regulator 624 may be electrically or manually operated. In this manner, the pressure at which the hydrogen-oxygen-air mixture is supplied to the combustion cylinder 626 may be varied depending upon the design needs of the hydrogen generator system 600 and the conditions at which the hydrogen generator system 600 is operating.

The combustion cylinder 626 is operably coupled to the gas line 610 such that the hydrogen-oxygen-air mixture is permitted to flow from the pressure regulator 624 to the combustion cylinder 626 at a predetermined pressure. The combustion cylinder 626 is a reciprocating piston type engine having a cylinder 626*a* and a piston-connecting rod assembly 626*b*. The piston (not shown) of the piston connecting rod assembly 626*b* is slidably disposed within the cylinder 626*a* such that a combustion chamber (not shown) is formed. The cylinder 626*a* includes an inlet port 626*c* disposed thereon that is in fluid communication with the combustion chamber and the gas line 610 such that the hydrogen-oxygen-air mixture may be transmitted from the storage chamber 618 to the combustion chamber of the cylinder 626*a*. The inlet port 626*c* is operably coupled to an inlet port valve (not shown) that is configured to selectively inhibit and permit the flow of the hydrogen-oxygen-air mixture into the combustion chamber depending upon the position of the piston of the piston connecting rod assembly 626*b* within the combustion cycle.

The combustion cylinder 626 may include a glow plug or spark plug 626*d* that is selectively secured to the cylinder 626*a* and operably coupled to the combustion chamber. In this manner, the glow plug 626*d* acts as a heat source to aid in combustion of the hydrogen-oxygen-air mixture within the combustion chamber and thereby cause the piston connecting rod assembly 626*b* to be driven away from the glow plug 626*d* during a power stroke thereof. It is envisioned that the timing of the combustion cylinder 626 (e.g., timing at which the inlet port valve permits the hydrogen-oxygen-air mixture to flow through the inlet port 626*c* and/or the timing at which the spark plug fires) may be controlled mechanically (e.g., by a linkage operably coupled to a flywheel, etc.) or electronically by the computer management system 800. As will be appreciated, neither the glow plug nor a spark plug is expressly necessary, and the combustion cylinder may be solely compression fired as the piston moves within the combustion cylinder. In this manner, the combustion cylinder may act as either a four-stroke or a two-stroke engine depending on the placement of the inlet and exhaust valves and ports.

In a preferred embodiment the combustion cylinder is a compression fired two-stroke engine. In such a configuration, the exhaust is uncovered by the piston as the piston travels in the direction of bottom dead center. The high-pressure combustion gases exit the exhaust port and continue to do so as the piston travels past bottom dead center and begins compression of the gas in the combustion cylinder 626. At a certain point of travel, the piston again covers the exhaust ports and further travel of the piston compresses the air in the combustion cylinder 626. Injection of the hydrogen and oxygen mixture occurs after this point, and as the mixture is further compressed at a point a few degrees before or after top dead center the of hydrogen and oxygen mixture combusts and propels the piston towards bottom dead center to drive the piston rod and therewith the generator 702 and/or flywheel 706.

Alternatively, the combustion cylinder 626 may be a four-stroke design where combustion occurs only every second time that the piston reaches top dead center. In such a design, following ignition of the hydrogen and oxygen mixture the exhaust valve remains closed until the piston nears bottom dead center. At this point the exhaust valve opens, and as the piston travels towards top dead center the combusted gases are exhausted via the exhaust valve. The inlet valve opens either before the piston reaches top dead center to assist with exhaust or shortly after the piston reaches top dead center. As the piston travels back towards bottom dead center, the movement of the piston creates vacuum which draws oxygen and hydrogen into the combustion cylinder 626. After reaching bottom dead center the inlet valve closes and subsequent movement of the piston compresses the mixture until an ignition point is reached and the piston begins to travel towards bottom dead center, and the process repeats. As will be appreciated, the timing of compression, ignition, exhaust, and injection can be manipulated to achieve a desired efficiency. Further the volume of hydrogen and oxygen mixture can be adjusted for the desired power output and speed of the combustion cylinder 626 and generator 702.

In embodiments, the combustion cylinder 626 includes a cooling jacket 626e is disposed about an outer surface thereof. An interior portion (not shown) of the cooling jacket 626e includes a cooling fluid disposed therein, such as water, glycol, oil, etc. The interior portion of the cooling jacket 626e is in fluid communication with a radiator 628 or other suitable cooling device that is configured to cool the cooling fluid circulating within the cooling jacket 626e. Although generally illustrated as including a fan or other mechanical cooling device, it is contemplated that the radiator 628 may not include a fan. A thermostat 630 or other suitable temperature sensing device capable of permitting or inhibiting the flow of fluid therethrough based upon a temperature of the fluid is operably coupled to the cooling jacket 626e to ensure that the fluid within the cooling jacket 626e is maintained at a suitable temperature. In embodiments, the thermostat 630 is operably coupled to the computer management system 800 such that the computer management system 800 controls the opening and closing of a valve (not shown) associated with the thermostat 630.

In embodiments, the cooling jacket 626e may include a plurality of tubes or rods (not shown) that is configured to permit a cooling fluid to flow therewithin. Similar to the interior portion of the cooling jacket 626e described hereinabove, the plurality of tubes is fluidly coupled to the thermostat and to the radiator to cool the fluid flowing within the plurality of tubes to ensure the combustion cylinder 626 is operating at an optimal temperature.

It is envisioned that the combustion cylinder 626 may include a plurality of cooling fins (not shown) disposed on the outer surface that is configured to cool the combustion cylinder 626 using the ambient air. In embodiments, a fan (not shown) or other air moving device may be utilized to cause air to move over the plurality of cooling fins and enhance the cooling ability of the plurality of cooling fins.

Figure 12:
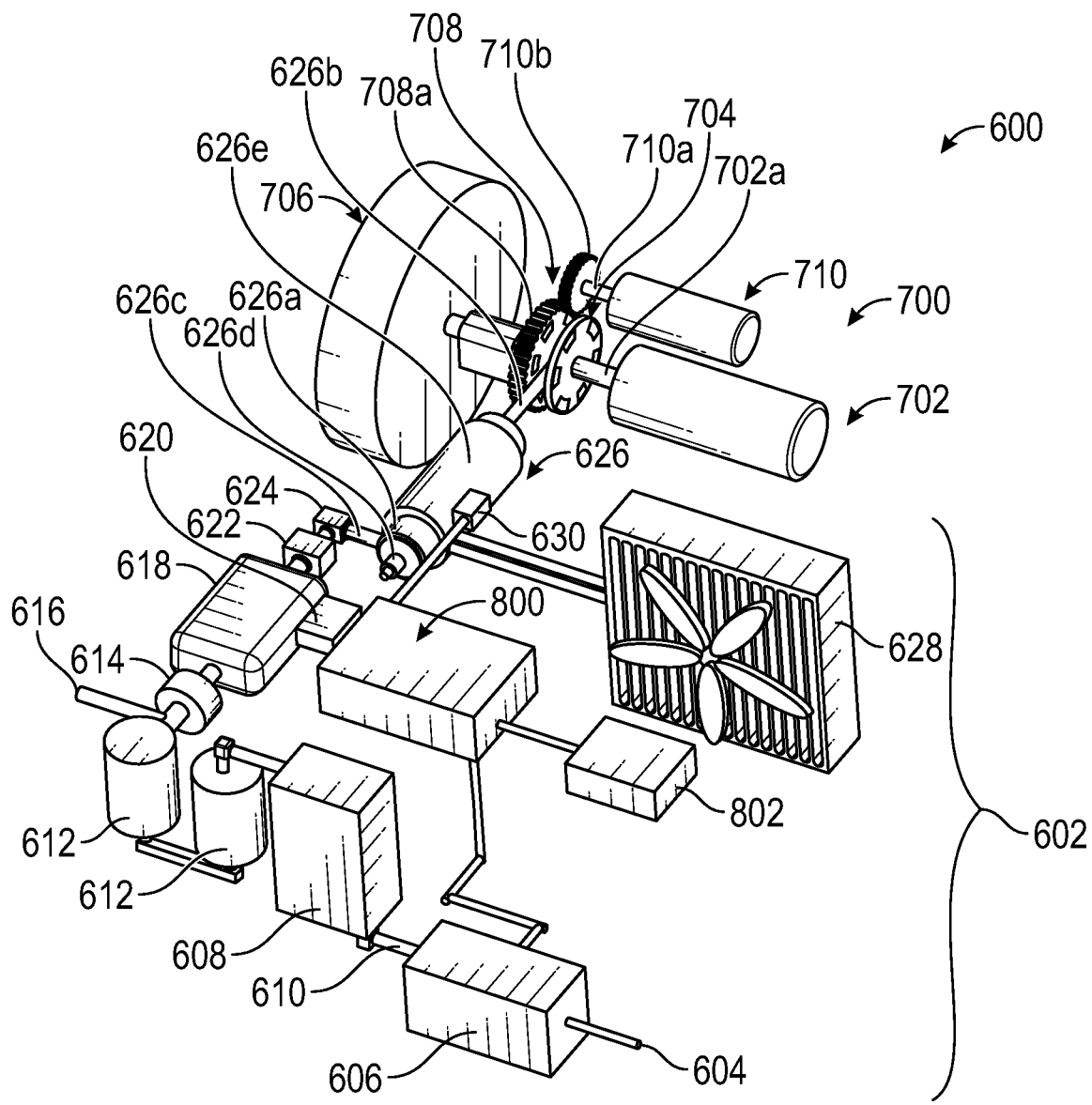
FIG. 12 is a perspective view of a hydrogen generation system provided in accordance with the present disclosure.

Continuing with FIG. 12, the electrical generation system 700 includes an electric generator 702, a motor coupling 704, a flywheel 706, a magnetic coupling 708, and a starter motor 710.

A distal portion of the piston connecting rod assembly 626b is operably coupled to a motor coupling 704. The motor coupling 704 is substantially similar to the motor coupling 80 and therefore, the motor coupling 704 will not be described in detail herein in the interest of brevity. The piston connecting rod assembly 626b is operably coupled to the motor coupling 704 at a location that is radially offset from a center or rotation of the motor coupling 704 such that a drive force during the power stroke of the piston connecting rod assembly 626b imparted on the motor coupling 704 causes the motor coupling 704 to rotate about its center of rotation. The motor coupling 704 is operably coupled to an input shaft 702a of the electric generator 702 at a center of rotation thereof, such that rotation of the motor coupling 704 effectuates a corresponding rotation of the input shaft 702a, which in turn, causes the electric generator 702 to generate electrical energy.

A flywheel 706 is rotatably supported adjacent to the motor coupling 704 and includes a magnetic coupling 708 operably coupled thereto. In this manner, rotation of the magnetic coupling 708 effectuates a corresponding rotation of the flywheel 706 and vice versa. The magnetic coupling 708 is substantially similar to the magnetic coupling 50 and therefore, the magnetic coupling 708 will not be described in detail herein in the interest of brevity. The magnetic coupling 708 is magnetically coupled to the motor coupling 704 such that rotation of the magnetic coupling 708 effectuates a corresponding rotation of the motor coupling 704 and vice versa. As can be appreciated, the interaction between the magnetic coupling 708 and the motor coupling 704 is substantially similar to that of the magnetic coupling 50 and the motor coupling 80 described in detail hereinabove. The flywheel 706 is substantially similar to the flywheels described hereinabove, and in embodiments, may be substantially similar to the flywheel assemblies 10 and may include one or more pods 300.

A starter motor 710 is operably coupled to the magnetic coupling 708 using any suitable means such that rotation of an output shaft 710a of the starter motor 710 effectuates a corresponding rotation of the magnetic coupling 708. In one non-limiting embodiment, the starter motor 710 is operably coupled to the magnetic coupling 708 using a pinion gear 710b disposed on the output shaft 710a of the starter motor 710 and a spur gear 708a disposed on a portion of the magnetic coupling 708. As can be appreciated, rotation of the magnetic coupling 708 effectuates a corresponding rotation of the motor coupling 704, which in turn, causes the piston connecting rod assembly 626b to reciprocate within the combustion chamber of the combustion cylinder 626. Continued rotation of the magnetic coupling 708 causes the combustion cylinder 626 to maintain combustion and cause the piston connecting rod assembly 626b to drive the motor coupling 704. In this manner, the starter motor 710 is selectively utilized to start the combustion process.

With continued reference to FIG. 12, the computer management system 800 includes a processor (not shown) and a memory (not shown) operably coupled to the processor. The memory stores instructions, which when executed by the processor cause the processor to interrogate or otherwise control various sensors and valves associated with the hydrogen generator system 600, as described hereinabove. The computer management system 800 may be operably coupled to a computer system (not shown) located at a remote location, such that the hydrogen generator system 600 may be controlled remotely. In embodiments, the computer management system 800 is operably coupled to a battery back-up system 802, such as the battery storage compartment 450 described in detail hereinabove. In this manner, should the electrical power supplied by the electrical power supply 604 be interrupted, the battery back-up system supplies the computer management system 800 and the electrical components of the hydrogen generator system 600 with electrical energy to ensure uninterrupted generation of electrical energy by the hydrogen generator system 600. As can be appreciated, the computer management system 800 is configured to issue various alarms and signals to the use based upon the operation of the hydrogen generator system 600 and is capable of autonomously running the hydrogen generator system 600.

Figure 13:
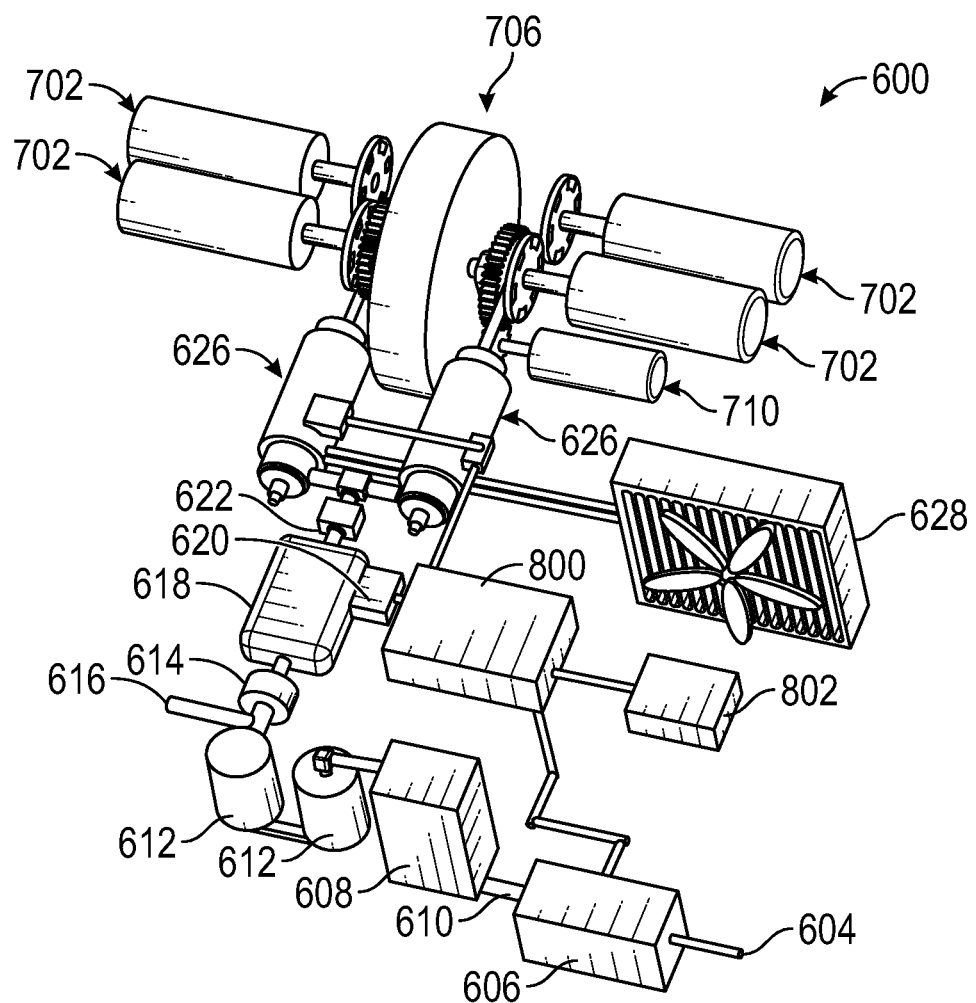
FIG. 13 is a perspective view of another embodiment of the hydrogen generation system of FIG. 12 provided in accordance with the present disclosure.
Figure 14:
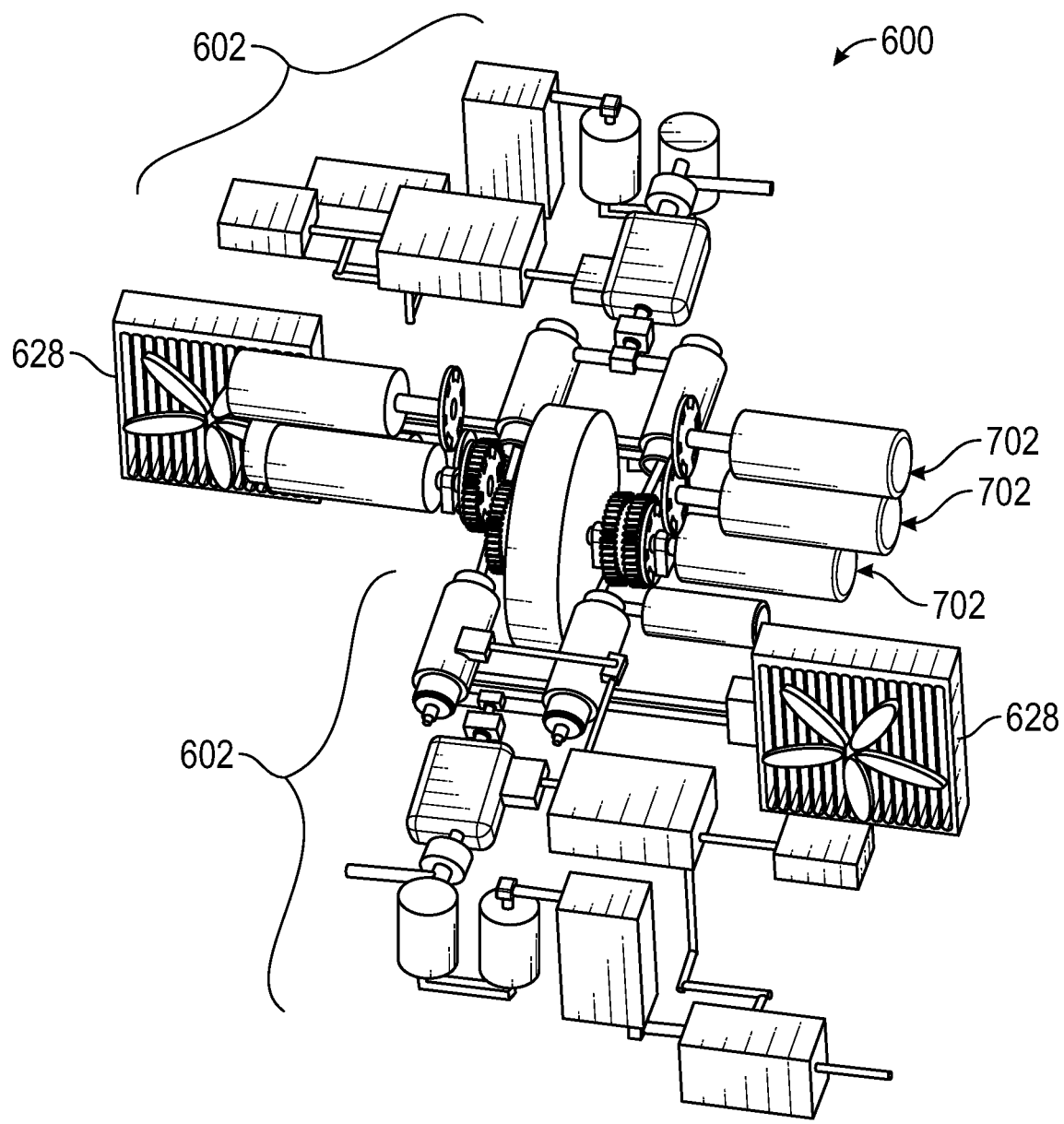
FIG. 14 is a perspective view of yet another embodiment of the hydrogen generation system of FIG. 12 provided in accordance with the present disclosure.
Figure 15:
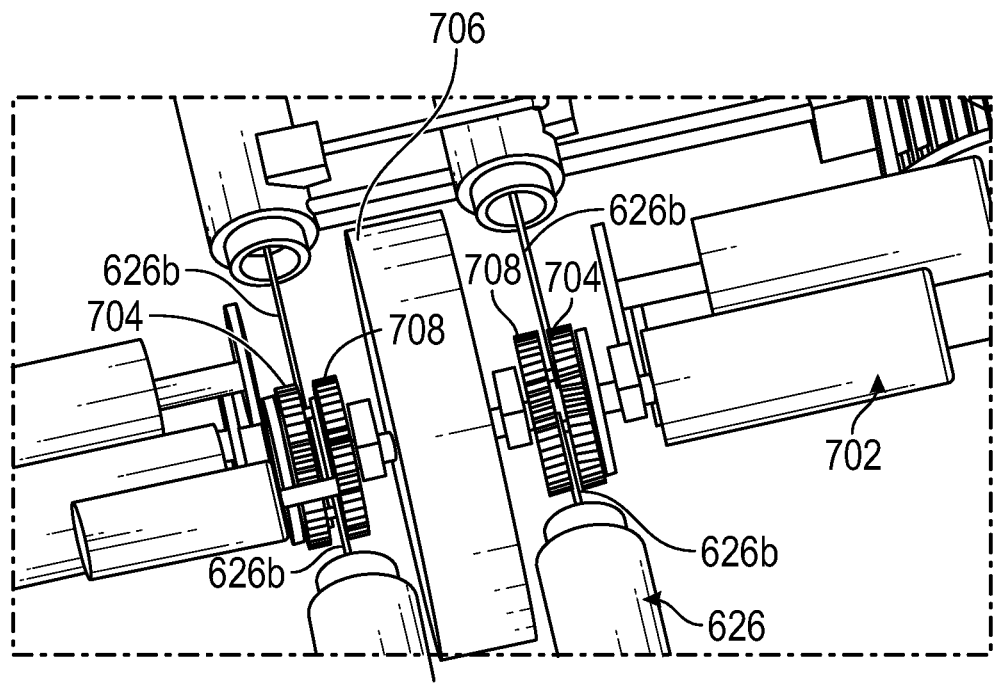
FIG. 15 is a perspective view magnetic coupling of the hydrogen generation system of FIG. 14.

As illustrated in FIGS. 13-15, is it envisioned that the hydrogen generator system 600 may include one or more combustion cylinders 626, one or more electric generators 630, and/or one or more flywheels 632, etc., depending upon the design needs of the hydrogen generator system 600. It is envisioned that the motor couplings 628 of each electric generator 702 may overlap one another such that rotation of one motor coupling 704 effectuates a corresponding rotation of an adjacent, overlapping motor coupling 704, thereby minimizing the number of components necessary to drive each respective electric generator 702.

With reference to FIG. 15, as can be appreciated, the piston connecting rod assembly 626b may be operably coupled to a portion of the motor coupling 704 or the magnetic coupling 708, and in embodiments having more than one combustion cylinder 626, the piston connecting rod assembly 626b of each respective combustion cylinder is operably coupled to an opposite one of the motor coupling 704 or magnetic coupling 708.

With reference to FIGS. 12-15, in operation, the computer management system 800 causes the hydrogen generator 606 to begin the electrolysis process and generate the hydrogen-oxygen gas mixture. Thereafter, the hydrogen-oxygen gas mixture flows through the gas bubbler 608 for filtration and to the one or more desiccant dryers 612 for drying. After exiting the desiccant dryers 612, air is introduced into the dry, filtered, hydrogen-oxygen gas mixture at the air intake 616 before the hydrogen-oxygen-air mixture is introduced to the supercharger 614. The supercharger 614 compresses the hydrogen-oxygen-air mixture forces the hydrogen-oxygen-air mixture into the storage chamber 618 for storage before use by the combustion cylinder 626. The computer management system 800 monitors the pressure within the storage chamber 618 and if the pressure reaches a predetermined upper pressure limit, the computer management system 800 causes the hydrogen generator 604 to shut off and cease the generation of hydrogen and oxygen gas. Similarly, if the pressure within the storage chamber 618 reaches a predetermined lower pressure limit, the computer management system 800 causes the hydrogen generator to turn on and begin generating hydrogen and oxygen gas to replenish the hydrogen-oxygen-air mixture stored within the storage chamber 618.

When the generation of electrical energy is desired, the computer management system 800 causes the starter motor 710 to begin rotating the flywheel 706 which effectuates rotation of the magnetic coupling 708, which effectuates rotation of the motor coupling 704, which in turn, effectuates rotation of the electric generator 702 and the reciprocation of the piston connecting rod assembly 626b within the cylinder 626a of the combustion cylinder 626. In this manner, the combustion process begins and the electric generator 702 is caused to generate electrical energy by the combustion of the hydrogen-oxygen-air mixture fed into the combustion cylinder 626. As can be appreciated, the computer management system 800 may turn the combustion process within the combustion cylinder 626 on and off depending upon the electrical load placed upon the electric generator 702.

The computer management system 800 monitors the temperature of the combustion cylinder 626 and causes the thermostat to open or close to permit and inhibit the flow of cooling fluid to the radiator 628 to maintain the combustion cylinder 626 at a desired temperature. The computer management system 800 similarly monitors the amount of air mixed into the hydrogen-oxygen gas mixture at the air intake 616 and controls a valve or other suitable device (not shown). The computer management system 800 controls the flow of the hydrogen-oxygen-air mixture into the combustion chamber of the combustion cylinder 626 based upon the location of the piston connecting rod assembly 626b within the cylinder 626a to ensure the desired operation of the combustion cylinder 626.

It is envisioned that the hydrogen generator system 600 may be utilized within any of the devices and system described hereinabove. In embodiments, the hydrogen generator system 600 may be utilized in the renewable energy generation system 400. It is contemplated that the hydrogen generator system 600 may be utilized as a standalone system or in combination with one or more hydrogen generator systems 600, renewable energy generation systems 400, solar arrays, hydrodynamic systems, etc.

Figure 16:
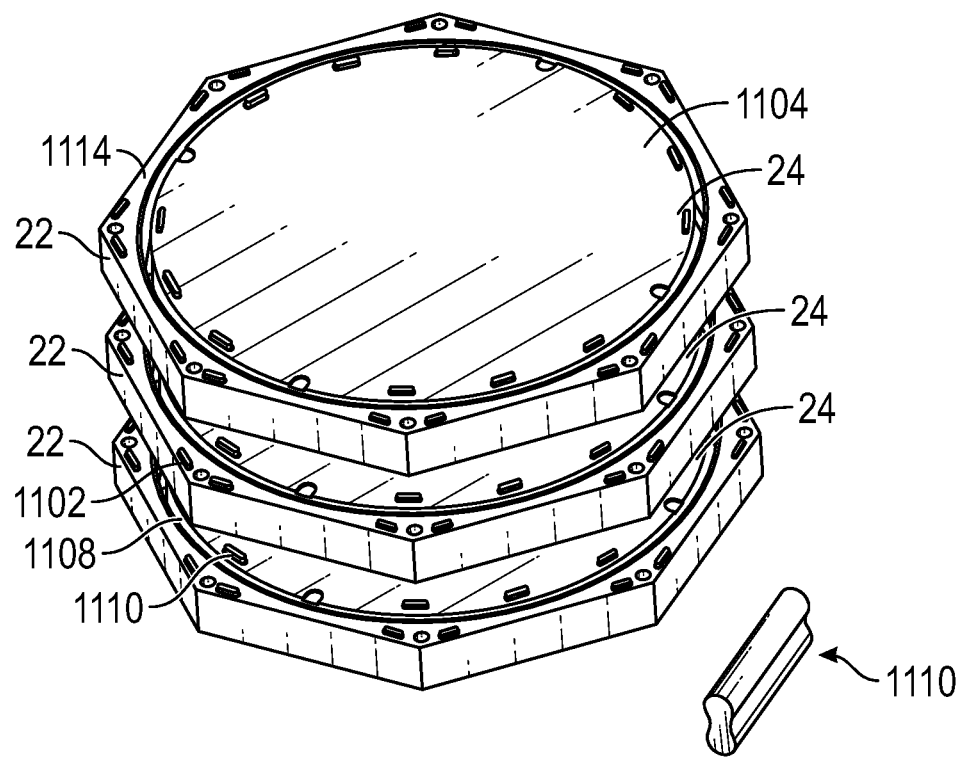
FIG. 16 is a top perspective view of a flywheel and flywheel housing connecting system and method in accordance with the disclosure.
Figure 17:
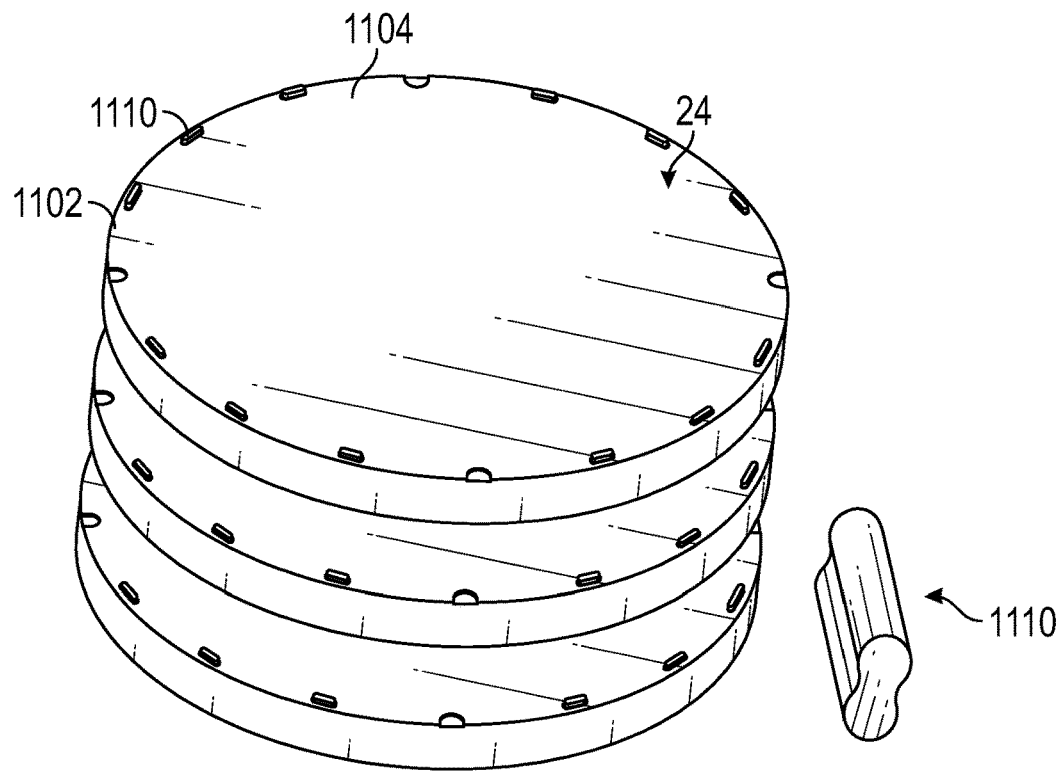
FIG. 17 is a top perspective view of a flywheel and connecting system and method in accordance with the disclosure.
Figure 18:
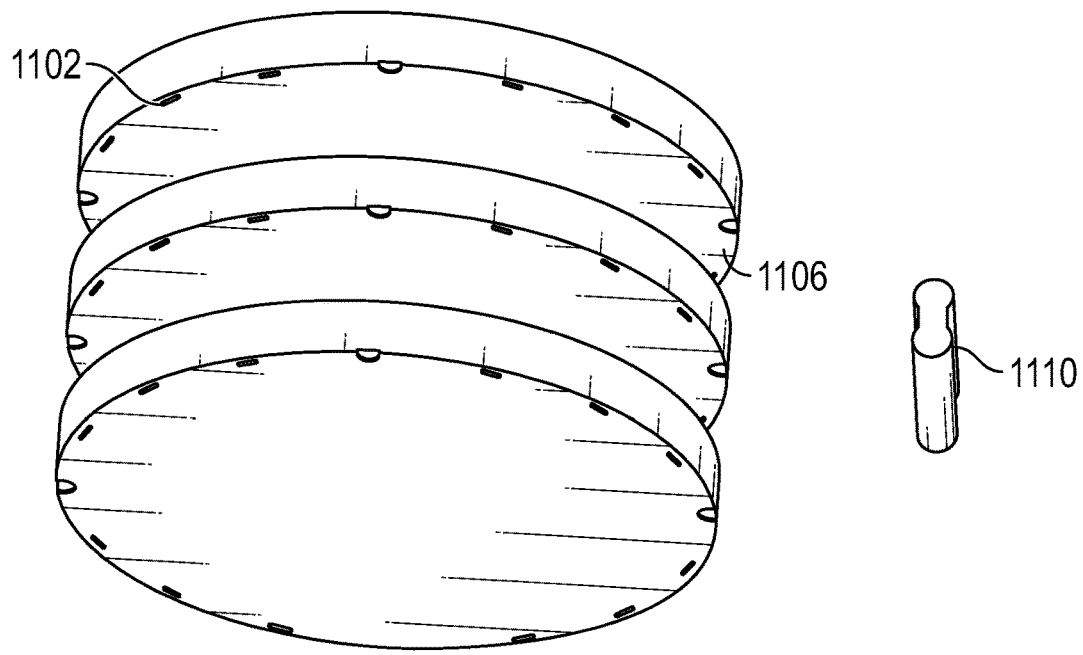
FIG. 18 is a bottom perspective view of a flywheel connecting system and method in accordance with the disclosure.
Figure 19:
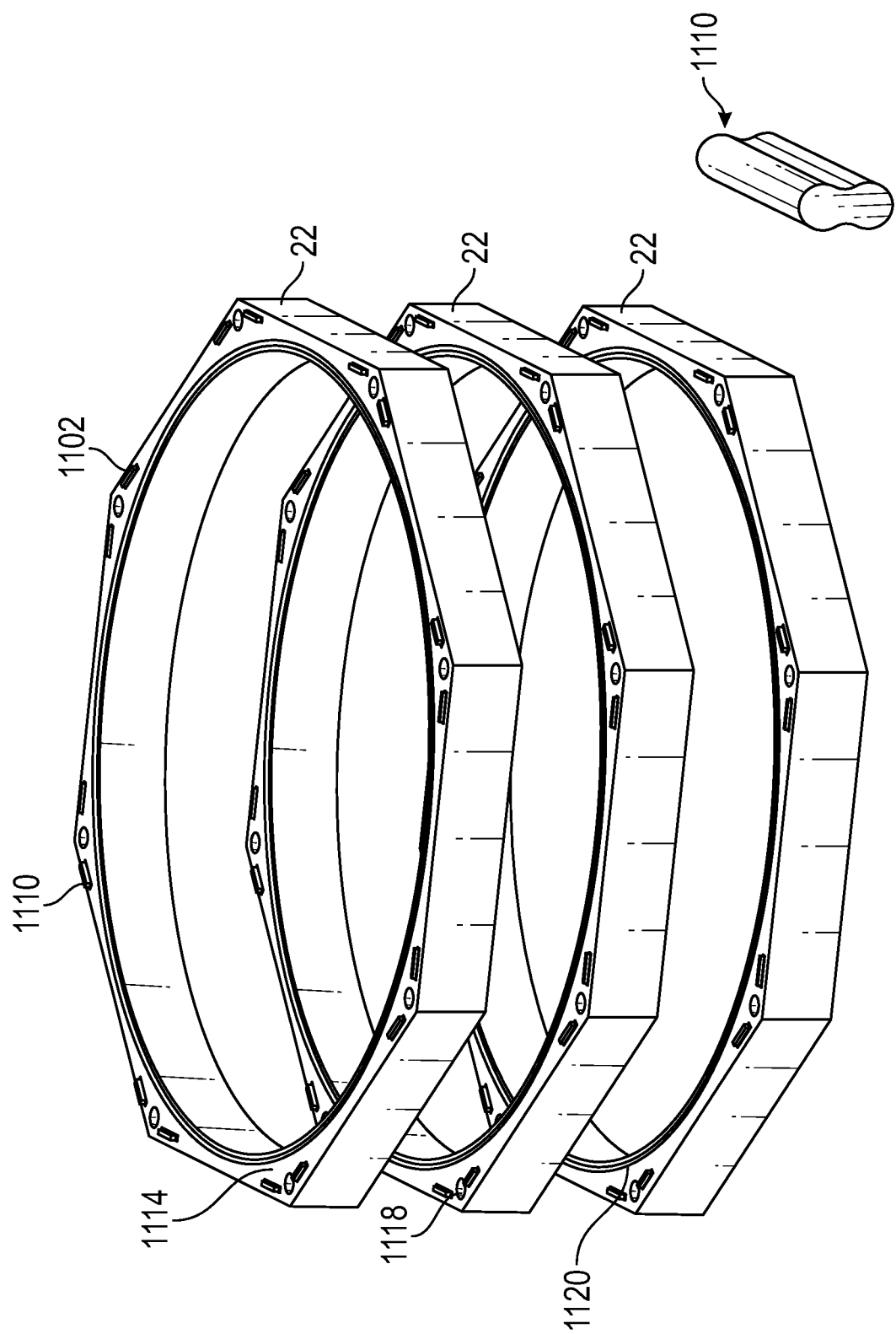
FIG. 19 is a top perspective view of a flywheel housing connecting system and method in accordance with the disclosure.
Figure 20:
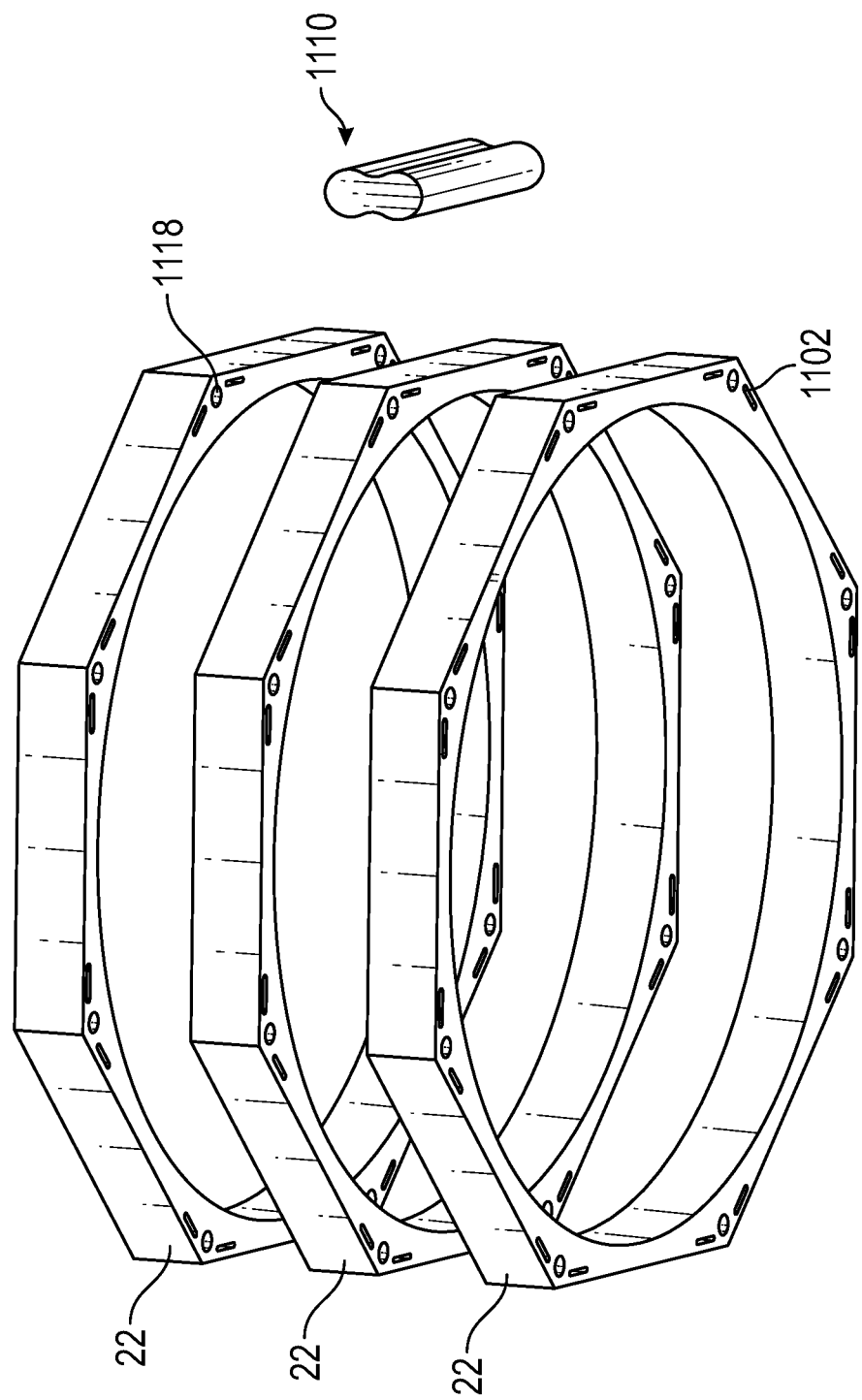
FIG. 20 is a bottom perspective view of a flywheel housing connecting system and method in accordance with the disclosure.

FIGS. 16-20 depict a system and method of securing a desired number of flywheel housings 22 and a desired number of flywheels 24 such that they form substantially monolithic structures. These monolithic structures ensure that the flywheels 24 rotate together and that the flywheel housings 22 are secured to one another and are prevented from rotating. As depicted in FIG. 16, each flywheel 24 includes a plurality of machined slots 1102. The machined slots 1102 are formed on both the top and bottom surfaces 1104 and 1106 of each flywheel 24. In one embodiment they are formed proximate the peripheral edge 1108 of the flywheel 24, though they may be formed at any location in the flywheel 24 as long as the locations of the machined slots 1102 formed on a top surface 1104 match those formed on an adjacent bottom surface 1104 of the next flywheel 24 in a stack of flywheels. Placed in each of these machined slots 1102 is a pin 1110. The pin 1110 is placed, for example, in a machined slot 1102 formed in a top surface 1104 of one flywheel 24. When all of the machined slots 1102 in a top surface 1104 are filled with pins 1110, a second flywheel 24, having machined slots 1102 formed in a bottom surface 1106 is placed such that the machined slots 1102 on the bottom surface 1106 receive the pins 1110. The pins 1110 may be press fit into the machined slots 1102, or they may simply have a secure but hand fit. The two flywheels 24 are secured to one another by the weight of the top flywheel 24 on the bottom flywheel 24 and the pins 1110. As depicted in FIGS. 16-20, the pins 1110 have a "peanut" shape, though other shapes can be utilized without departing from the scope of the disclosure. Further, though shown with slots 1102 being formed on all top and bottom surfaces 1104, 1106, the top most and bottom most flywheel 24 need not have slots 1102 formed in the top most and bottom most surface of the flywheel stack to reduce the amount of machining.

In a similar vein, each flywheel housing 22 includes similar machine slots 1102 formed on both top surface 1114 and bottom surface 1116 thereof. Placing successive flywheel housings 22 such that pins 1110 are received in the machine slots 1102 ensures alignment of the flywheel housings 22. Such alignment ensures that there will be no interference between the flywheel 24 and the flywheel housing 22. Further, this speeds the process of assembling the flywheel housings and holds them in place until the securement bolts 130 can be placed in the through holes 1118. As noted above an O-ring or gasket 1120 may be placed in a channel 1122 formed in each housing 22 to ensure that the flywheel housing 22 is air tight such that a vacuum may be formed on the interior of the flywheel housing 22.

Figure 21:
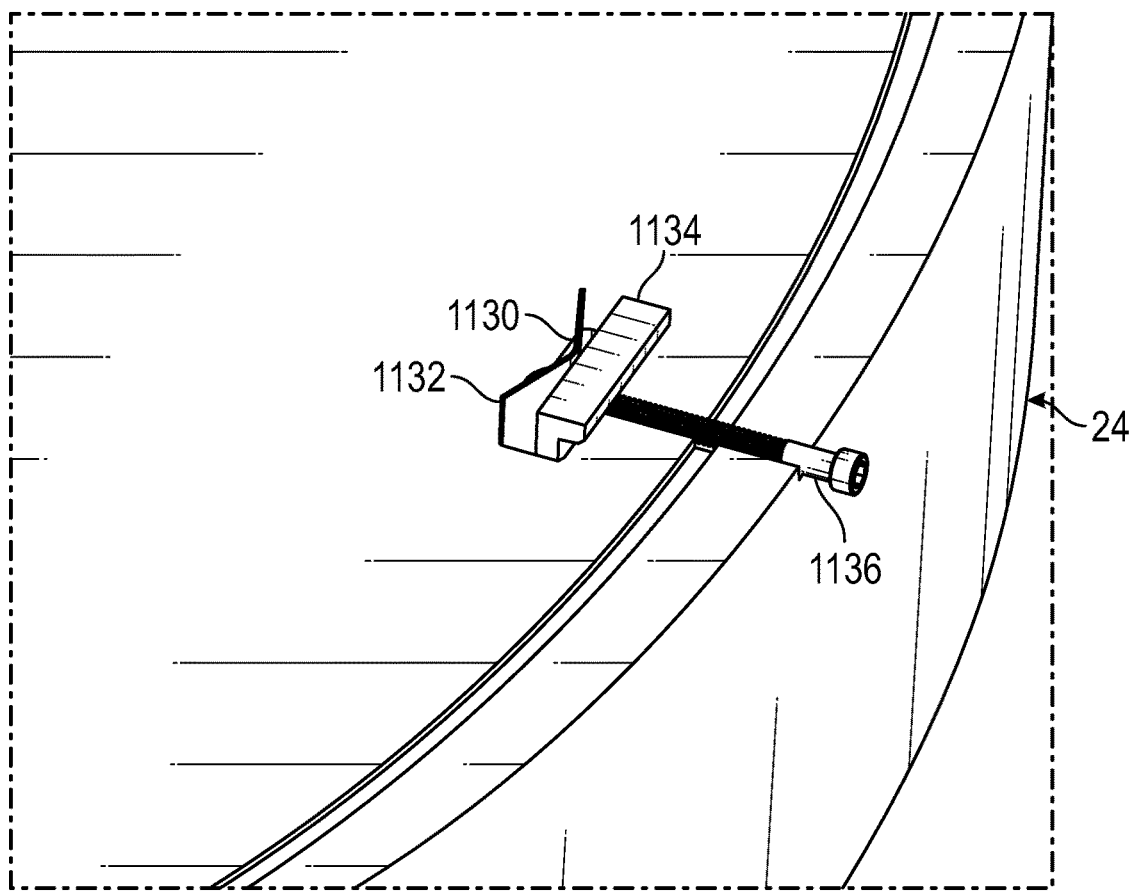
FIG. 21 is a top perspective view of a flywheel locking system and method in accordance with the disclosure.
Figure 22:
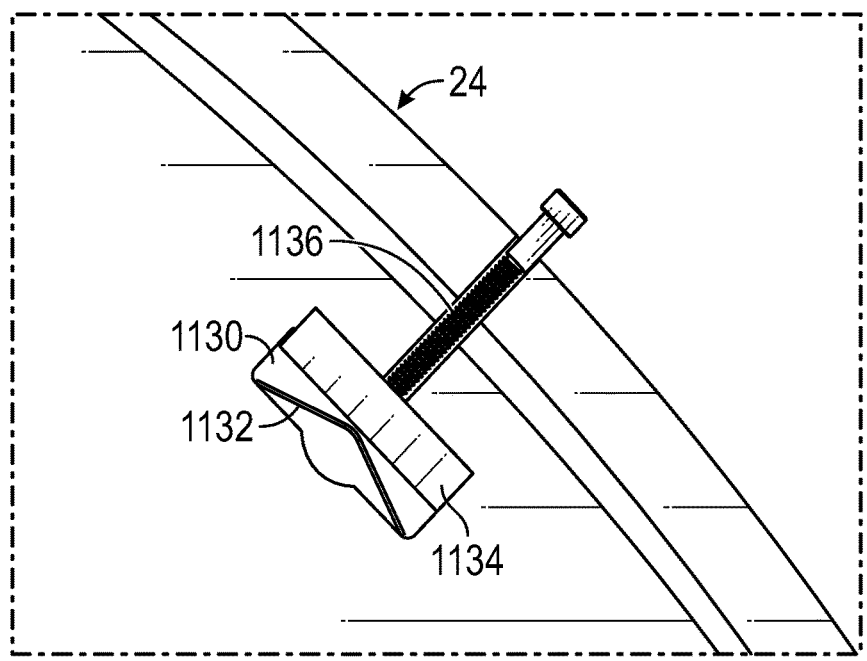
FIG. 22 is a top view of a flywheel locking system and method in accordance with the disclosure.
Figure 23:
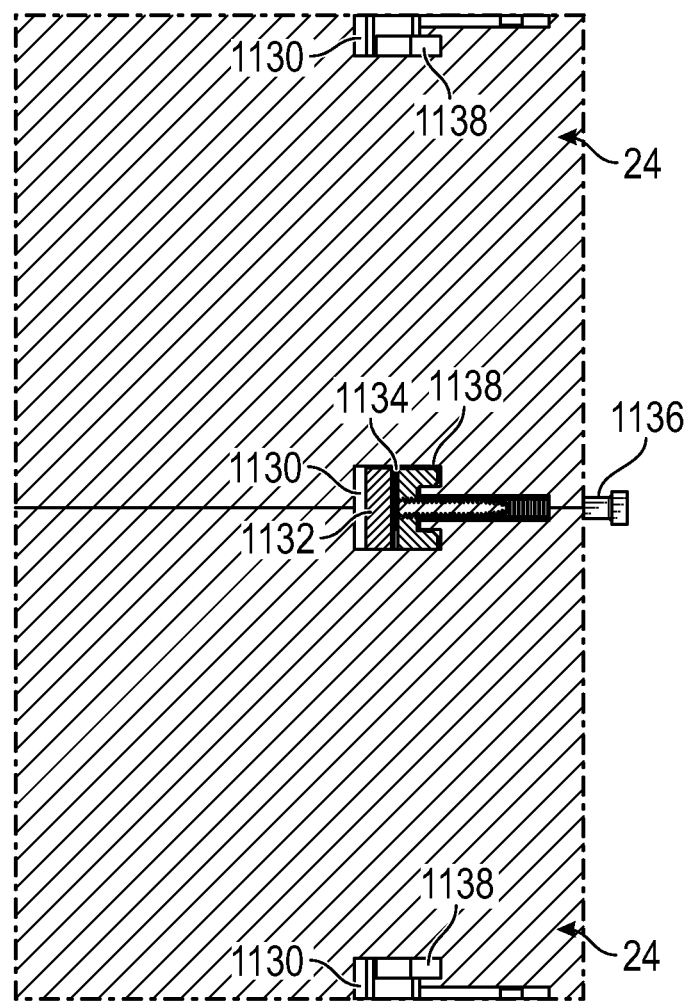
FIG. 23 is a side view of a flywheel locking system and method in accordance with the disclosure.
Figure 24:
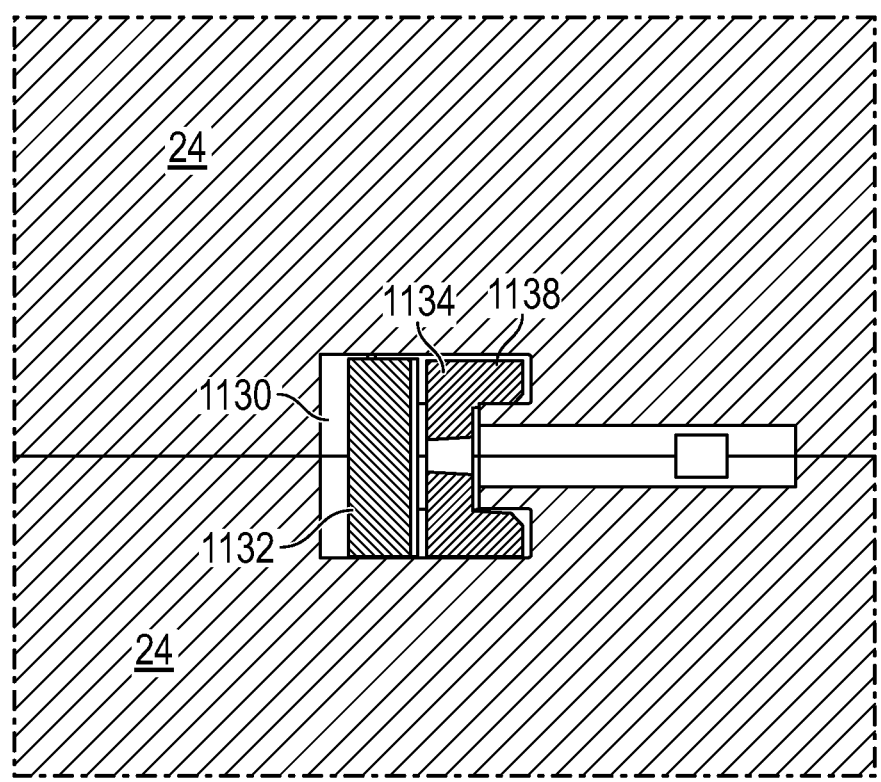
FIG. 24 is an enlarged side view of a flywheel locking system and method in accordance with the disclosure.
Figure 25:
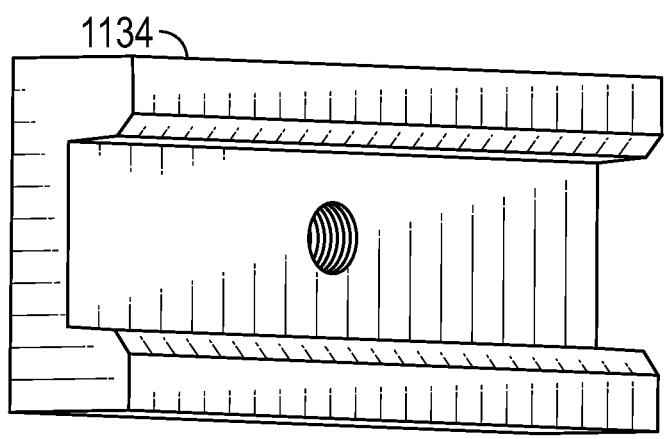
FIG. 25 is a perspective view of a U-shaped clip in accordance with the disclosure.

FIGS. 21-25 depict an alternative method of securing adjacent flywheels 24. As depicted in FIG. 21, each flywheel 24 includes a slot 1130 formed therein. Placed in this slot 1130 is a biasing spring 1132 and a U-shaped insert 1134. The biasing spring 1132 forces the U-shaped insert 1134 into an undercut portion 1136 of the slot 1130 (See FIG. 23). A screw 1136 acts on the U-shaped insert 1134 to force the U-shaped insert 1134 against the biasing spring 1132 to allow two flywheels 24 to be aligned and placed on top of each other, as shown in FIG. 23. Once two flywheels 24 are placed one on top of another, the screw 1136 can be withdrawn. The biasing spring 1132 forces the U-shaped insert 1134 into the undercut portion 1138 of the slot 1130 to secure the two (or more) flywheels 24 to one another. As will be appreciated matching slots 1130 with undercut portions 1138 are machined into both the top and bottom surfaces of the flywheels 24 so that the U-shaped insert 1134 can be received into the undercut portions 1138 of two successive flywheels 24 as shown. It will be appreciated that any number of flywheels 24 may be secured in this manner. Further, it will be appreciated that where a top surface of a flywheel 24 or a bottom surface of a flywheel 24 will not be mating with another flywheel 24, it need not include the slot 1130. FIG. 25 depicts a perspective view of the U-shaped insert 1134. If for some reason the flywheel stack should ever need to be de-constructed, re-insertion of the screws 1136 can be used to again compress the biasing spring 1132 and allow a top flywheel 24 to be removed from a bottom flywheel 24. As will be appreciated each flywheel 24 can include 2, 4, 6, 8, 10, or more slots 1130 formed therein to secure two or more flywheels 24 to one another.

It will be understood that various modifications may be made to the embodiments of the presently disclosed renewable energy generation systems. Therefore, the above description should not be construed as limiting, but merely as exemplifications of embodiments. Those skilled in the art will envision other modifications within the scope and spirit of the present disclosure.

What is claimed is:

1. A magnetic drive system comprising:
   a pair of magnetic gears supported by a first spindle and separated from each other on the first spindle by an air gap, each magnetic gear including a plurality of torque magnets arranged in a circumfrential manner about each of the pair of magnetic gears;
   a motor coupling gear supported by a second spindle, the motor coupling gear being radially offset from the pair of magnetic gears and configured to couple to a motor or generator;
   a radial flange operably connected to the motor coupling gear and including a pluraltiy of torque magnets, the radial flange having a diameter and thickness such that it spans the radial offset between the motor coupling gear and the pair of magnetic gears and fits within the air gap without contacting, wherein the torque magnets of the radial flange interact with the torque magnets of at least one of the pair of magnetic gears such that rotation of the motor coupling gear effectuates rotation of the pair of magnetic gears, and wherein the torque magnets of at least one of the pair of magnetic gears interact with torque magnets of a magnetic coupling associated with a flywheel, wherein rotation of the at least one of the pair of magnetic gears effectuates rotation of the flywheel; and
   a levitation disc mounted on a shaft of the flywheel, the levitation disc including a plurality of magnets mounted a first surface thereof.

2. The magnetic drive system of claim 1, wherein there is no contact bewteen magnetic gears and the magnetic coupling of the flywheel.

3. The magnetic drive system of claim 1, wherein the magnetic coupling is a mounted on a shaft of the flywheel.

4. The magnetic drive system of claim 1, further comprising a base plate, the base plate having a plurality of magnets mounted on a surface opposite the first surface of the levitation disc, such that the levitation disc is maintained a distance from the base plate.

5. The magnetic drive system of claim 4, further comprising one or more flywheels mounted on the shaft between the levitation disc and the magnetic coupling.

6. The magnetic drive system of claim 5, wherein the base plate is a portion of a housing, the flywheel being mounted within the housing and maintained in a levitated state by the interaction of the magnets in the levitation disc and the base plate, and limited in its movement by the interaction of the torque magnets in the magnetic coupling and a vacuum plate.

7. The magnetic drive system of claim 1, wherein the torque magnets on the radial flange are placed on the radial flange in an alternating north and south pattern.

8. The magnetic drive system of claim 7, wherein the torque magnets on the at least one of the pair of magnetic gears are placed on the magetic gear in an alternating north and south pattern and interact with the alternating pattern on the radial flange such that rotation of the radial flange effectuates rotation of the pair of magnetic gears.

9. A magnetic drive system comprising:
   a plurality of flywheel assemblies arranged in a pod, each flywheel assembly including at least one flywheel mounted on a shaft, a housing surrounding the at least one flywheel, a base plate with a plurality of magnets associated therewith, a levitation plate sercured to the shaft and having a plurality of magnets opposing the magnets of the base plate, a magnetic coupling having a plurlaity of torque magnets mouted on the shaft on an end opposite the levitation plate; and
   a central motor coupling coupled to a motor or generator and including a plurality of torque magnets formed on a surface thereof, wherein rotation of the central motor coupling causes rotation of the at least one flywheel of each of the plurality of flywheel assemblies.

10. The magnetic drive system of claim 9, wherein the central motor coupling includes a groove formed therein for receiving the torque magnets.

11. The magnetic drive system of claim 10, wherein the torque magnets in the groove are placed in an alternating north south pattern.

12. The magnetic drive system of claim 11, wherein at least a portion of the torque magnets of the magnetic coupling are arranged in an alternating north south pattern to interact with the alternating pattern of torque magnets of the central coupling to enable rotation of each of the at least one flywheel in the plurality of flywheel assemblies.

13. The magnetic drive system of claim 9, wherein the plurality of flywheel assemblies are encased in concrete.

14. A system for generation and storage of electrical energy comprising:
   at least one renewable energy source;
   at least one flywheel configured to receive energy produced by the at least one renewable energy source;
   a hydrocarbon generator configured to convert a hydrocarbon received from a hydrocarbon source into energy and to transmit at least a portion of the energy to the at least one flywheel; and
   a hydrogen-oxygen generator configured to selectively receive a portion of the energy produced by the renewable energy source or the hydrocarbon generator and to generate a hydrogen-oxygen gas mixture, wherein the hydrogen-oxygen gas mixture is directed to the hydrocarbon generator for mixing with the hydrocarbon from the hydrocarbon source to generate energy.

15. The system for generation and storage of electrical energy of claim 14, wherein the renewable energy source is an array of solar panels.

16. The system for generation and storage of electrical energy of claim 14 further comprising a plurality of flywheels, wherein the plurality of flywheels store energy and selectively drive a generator to produce electrical energy for transmission to a consumer or to an electrical grid.

17. The system for generation and storage of electrical energy of claim 14 further comprising a battery bank.

18. The system for generation and storage of electrical energy of claim 14, further comprising a computer managment sytem located at a remote location to ensure uninterrrupted generation of electrical energy.

* * * * *